(12) United States Patent
Atmur et al.

(10) Patent No.: US 7,900,547 B2
(45) Date of Patent: Mar. 8, 2011

(54) SYSTEM AND METHOD FOR PREPARING A LAUNCH DEVICE

(75) Inventors: Robert J. Atmur, Whithier, CA (US); Ron A. Kubinski, Mission Viejo, CA (US); Thorin Arthur Rogers, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 463 days.

(21) Appl. No.: 12/016,130

(22) Filed: Jan. 17, 2008

(65) Prior Publication Data
US 2009/0308237 A1 Dec. 17, 2009

(51) Int. Cl.
F41F 3/04 (2006.01)
F41F 3/042 (2006.01)

(52) U.S. Cl. ........................................ 89/1.815; 89/1.82

(58) Field of Classification Search ...... 89/1.801–1.806, 89/1.8, 1.815, 1.82
See application file for complete search history.

(56) References Cited

U.S. PATENT DOCUMENTS

| | | | | |
|---|---|---|---|---|
| 2,450,929 A * | 10/1948 | Ashworth et al. | ........... | 89/1.804 |
| 2,949,823 A * | 8/1960 | Ross | ........... | 89/1.815 |
| 2,968,410 A * | 1/1961 | Hamilton et al. | ........... | 414/783 |
| 2,987,964 A * | 6/1961 | Logan | ........... | 89/1.815 |
| 3,122,891 A * | 3/1964 | Thomas | ........... | 62/52.1 |
| 3,128,066 A * | 4/1964 | Bailey | ........... | 244/114 R |
| 3,160,289 A * | 12/1964 | Leefer | ........... | 414/679 |
| 3,242,809 A * | 3/1966 | Bauer | ........... | 89/1.8 |
| 3,303,740 A * | 2/1967 | Grayson et al. | ........... | 89/1.815 |
| 3,379,097 A * | 4/1968 | Fisher | ........... | 89/1.816 |
| 3,893,366 A * | 7/1975 | Murray | ........... | 89/1.801 |
| 3,981,224 A * | 9/1976 | Byars et al. | ........... | 89/1.815 |
| 4,363,257 A * | 12/1982 | Harris et al. | ........... | 89/1.802 |
| 4,508,404 A | 4/1985 | Frawley | | |
| 4,932,607 A * | 6/1990 | Layton et al. | ........... | 244/63 |
| 4,976,399 A | 12/1990 | Bay | | |
| 5,191,162 A * | 3/1993 | Czimmek | ........... | 89/1.802 |
| 5,294,078 A * | 3/1994 | Gurr | ........... | 244/116 |
| 5,850,989 A * | 12/1998 | Trudeau et al. | ........... | 244/63 |
| 5,924,648 A * | 7/1999 | Ellinthorpe | ........... | 244/63 |
| 5,932,830 A * | 8/1999 | Kristensen et al. | ........... | 89/1.801 |
| 6,024,006 A * | 2/2000 | Kindem et al. | ........... | 89/1.801 |
| 6,135,695 A * | 10/2000 | Kindem et al. | ........... | 414/139.9 |
| 6,186,039 B1 * | 2/2001 | Mueller et al. | ........... | 89/1.805 |
| 6,223,675 B1 | 5/2001 | Watt | | |
| 2004/0069136 A1 * | 4/2004 | Smith et al. | ........... | 89/1.815 |

* cited by examiner

*Primary Examiner* — Bret Hayes
*Assistant Examiner* — Reginald Tillman, Jr.
(74) *Attorney, Agent, or Firm* — Klintworth & Rozenblat IP LLC

(57) ABSTRACT

A launch device may be prepared for launch. The launch device may be assembled in a horizontal position on a mobile device. A lifting device attached to the mobile device may be coupled to the launch device. The launch device may be moved to a launch site using the mobile device. The launch device may be moved to a vertical position at the launch site using the lifting device. The launch device may be launched.

46 Claims, 22 Drawing Sheets

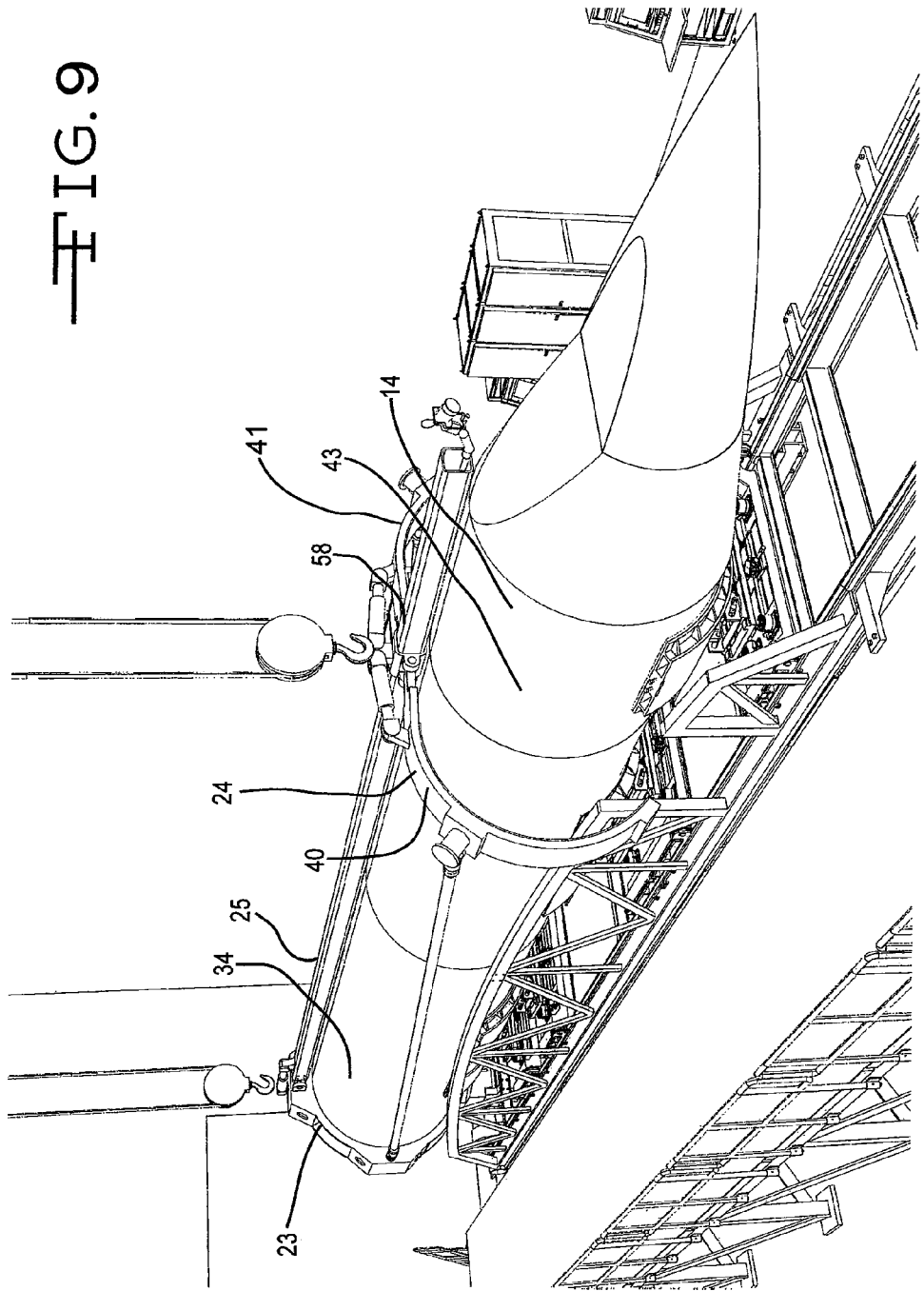

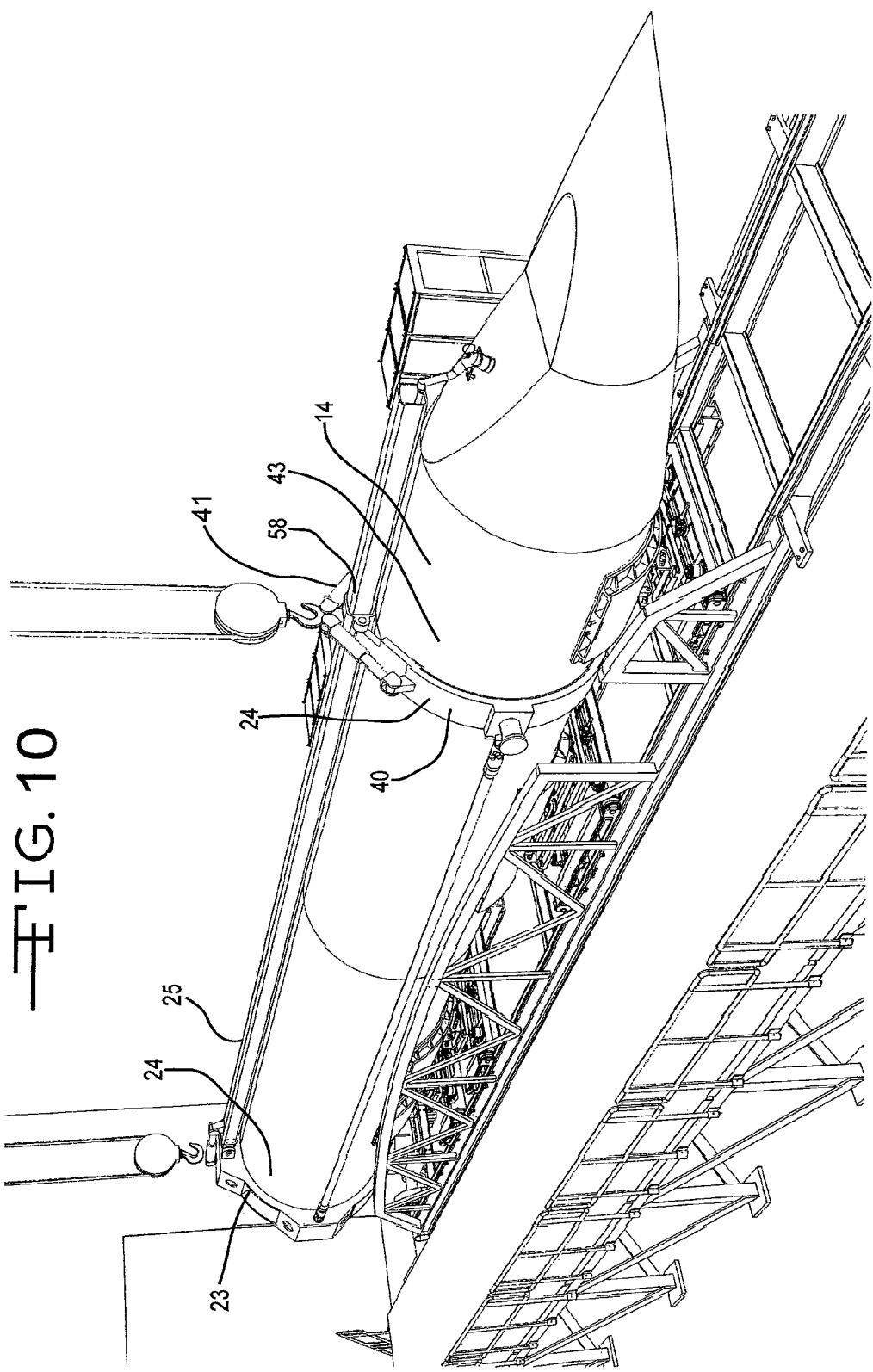

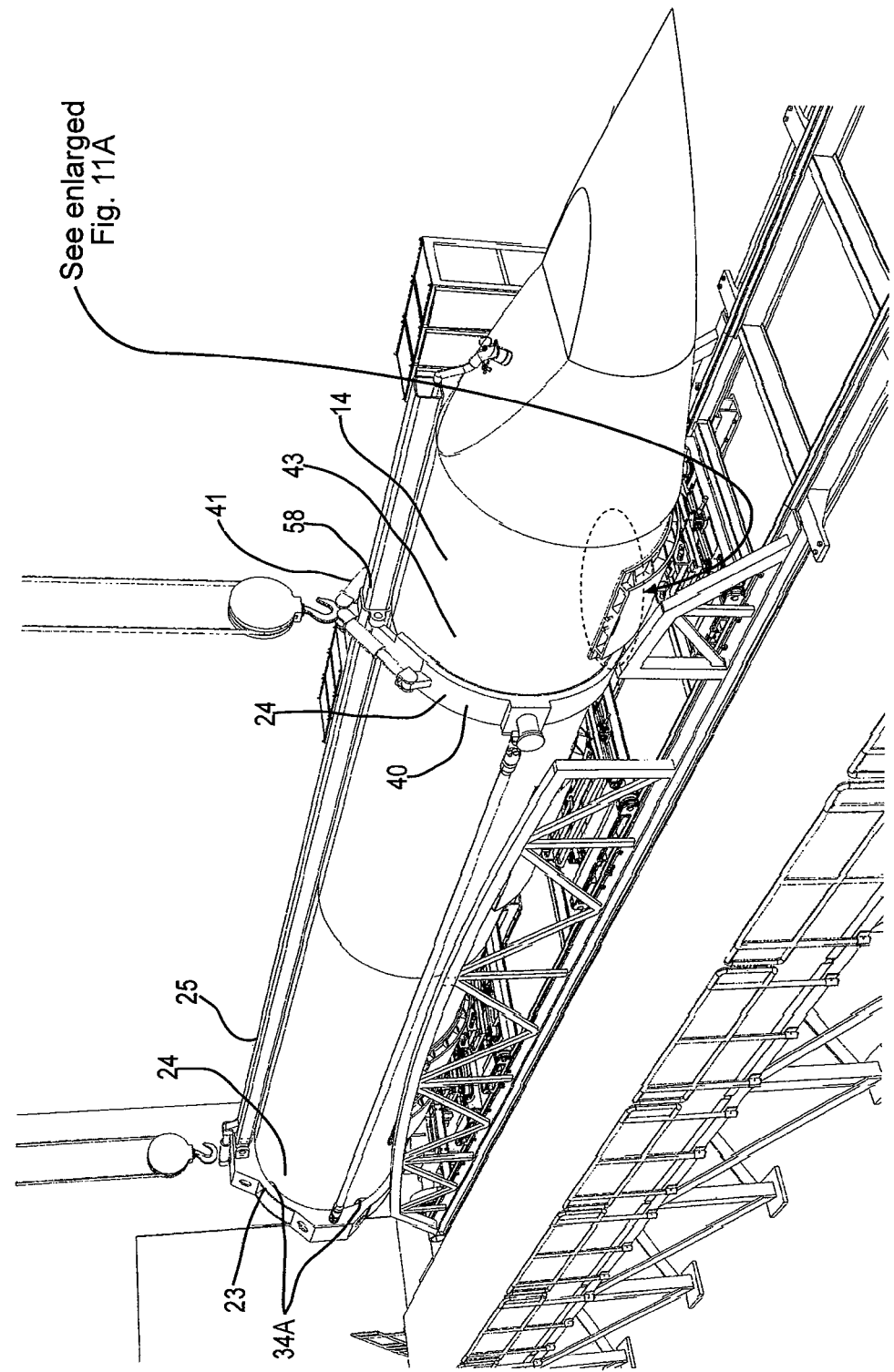

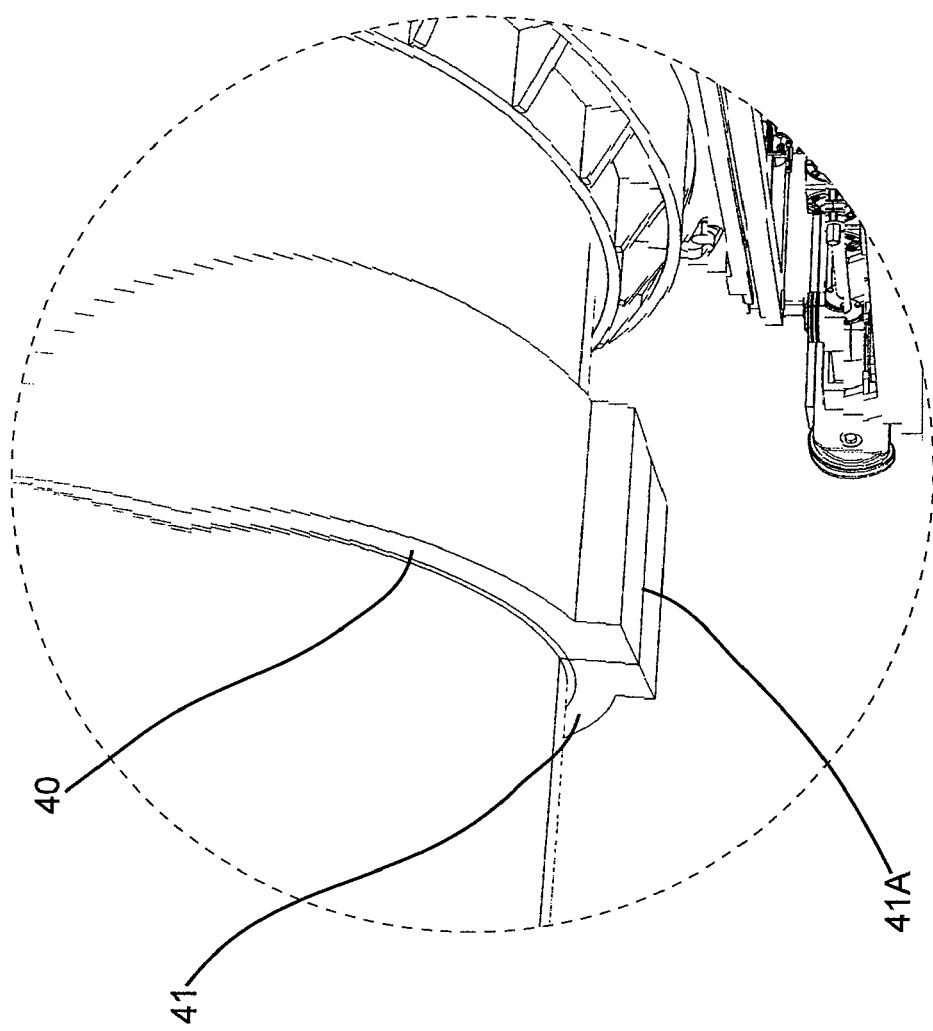

SYSTEM AND METHOD FOR PREPARING A LAUNCH DEVICE

BACKGROUND

There are many existing apparatus and methods for preparing launch devices, such as missiles, to be launched using a global reach system. Some of the existing apparatus and methods utilize silos. However, the use of silos may be costly, time-consuming, and require an excessive number of human man-power, machines, and tools.

An apparatus and/or method for preparing a launch device is needed to decrease one or more problems associated with one or more of the existing apparatus and/or methods.

SUMMARY

In one aspect of the disclosure, a method of preparing a launch device for launch may be provided. In one step, a launch device may be assembled in a horizontal position on a mobile device. In another step, a lifting device attached to the mobile device may be coupled to the launch device. In still another step, the launch device may be moved to a launch site using the mobile device. In yet another step, the launch device may be moved to a vertical position at the launch site using the lifting device. In an additional step, the launch device may be launched.

In another aspect of the disclosure, an apparatus may be provided for preparing a launch device for launch. The apparatus may include a mobile device, and a lifting device. The mobile device may be for assembling a launch device in a horizontal position on the mobile device, and for moving the launch device in a horizontal position to a launch site. The lifting device may be for coupling the launch device to the mobile device during assembly of the launch device, and for moving the launch device to a vertical position at the launch site.

In one aspect of the disclosure, an apparatus may be provided for attaching to a launch device. The apparatus may comprise a first attachment member, a second attachment member, a support member, and a truss device. The first attachment member may be configured to support the propulsion end of a launch device. The second attachment member may comprise articulating first and second arm members configured to attach and detach together around another end of the launch device. The support member may be connected between the first attachment member and the second attachment member. The truss device may be attached to at least one of the first attachment member and the second attachment member. The truss device may be configured to raise and lower a launch device attached to the apparatus.

In another aspect of the disclosure, a method may be provided for attaching an apparatus to a launch device. In one step, an apparatus may be provided comprising a first attachment member, a second attachment member comprising first and second arm articulating arm members, a support member connected between the first and second attachment members, and a truss device. In another step, the first and second articulating arm members may be opened. In still another step, the open first and second articulating arm members may be disposed around one end of the launch device. In yet another step, another end of the launch device may be disposed against the first attachment member. In an additional step, the first and second articulating arm members may be closed around the end of the launch device. In another step, the truss device may be attached to the first and second attachment members.

In one aspect of the disclosure, a method of assembling stages of a launch device may be provided. In one step, a plurality of unassembled stages of a launch device may be moved to an assembly area using at least one mobile device. The unassembled stages may be disposed horizontally on the at least one mobile device. In another step, the unassembled stages may be moved together at the assembly area in a horizontal position on the at least one mobile device. In yet another step, the unassembled stages may be attached together in the assembly area in a horizontal position on the at least one mobile device.

In another aspect of the disclosure, an apparatus for assembling stages of a launch device may be provided. The apparatus may include at least one mobile device, and a plurality of stage moving devices. The mobile device may be used for moving a plurality of unassembled stages of a launch device to an assembly area while the unassembled stages are disposed horizontally on the at least one mobile device. The plurality of stage moving devices may be attached to the at least one mobile device for horizontally moving the unassembled stages together at an assembly area on the at least one mobile device. The stage moving devices may be adapted to adjust positions and orientations of the unassembled stages to attach the unassembled stages together in a horizontal position on the at least one mobile device.

These and other features, aspects and advantages of the disclosure will become better understood with reference to the following drawings, description and claims.

BRIEF DESCRIPTION OF THE DRAWINGS

FIG. 9 shows a perspective view of the vertical lifting apparatus of FIG. 8 being disposed against the launch device under one of the steps of the method of FIG. 3;

FIG. 10 shows a perspective view of first and second arm members of the vertical lifting apparatus being closed around an end of the launch device under one of the steps of the method of FIG. 3;

FIG. 11 shows a perspective view of the first and second arm members of the vertical lifting apparatus of FIG. 10 being locked around the end of the launch device under one of the steps of the method of FIG. 3, while FIG. 11A shows an enlarged view within ellipse 11A shown in FIG. 11;

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
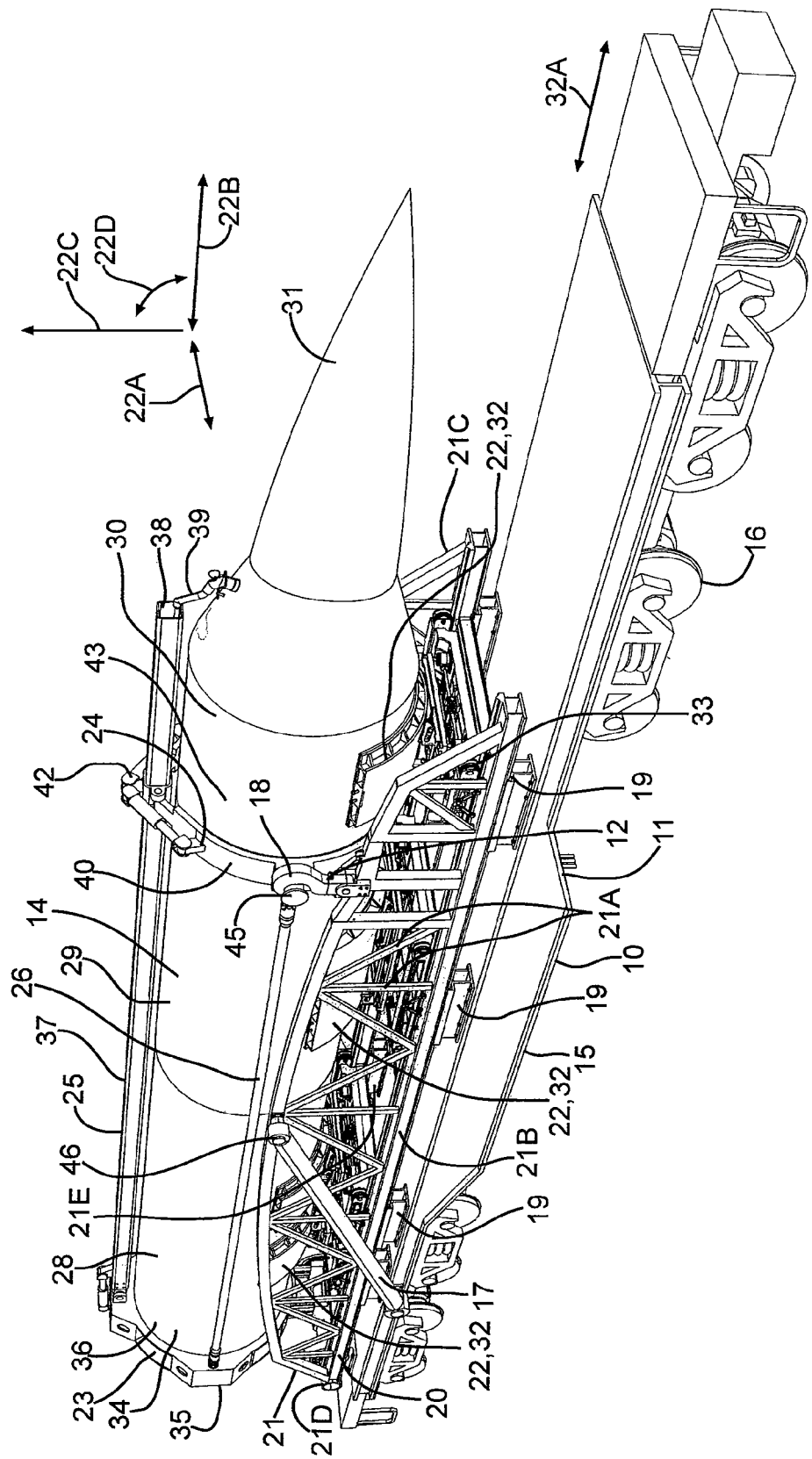
FIG. 1 shows a perspective view of a launch-device carrying apparatus.
Figure 2:
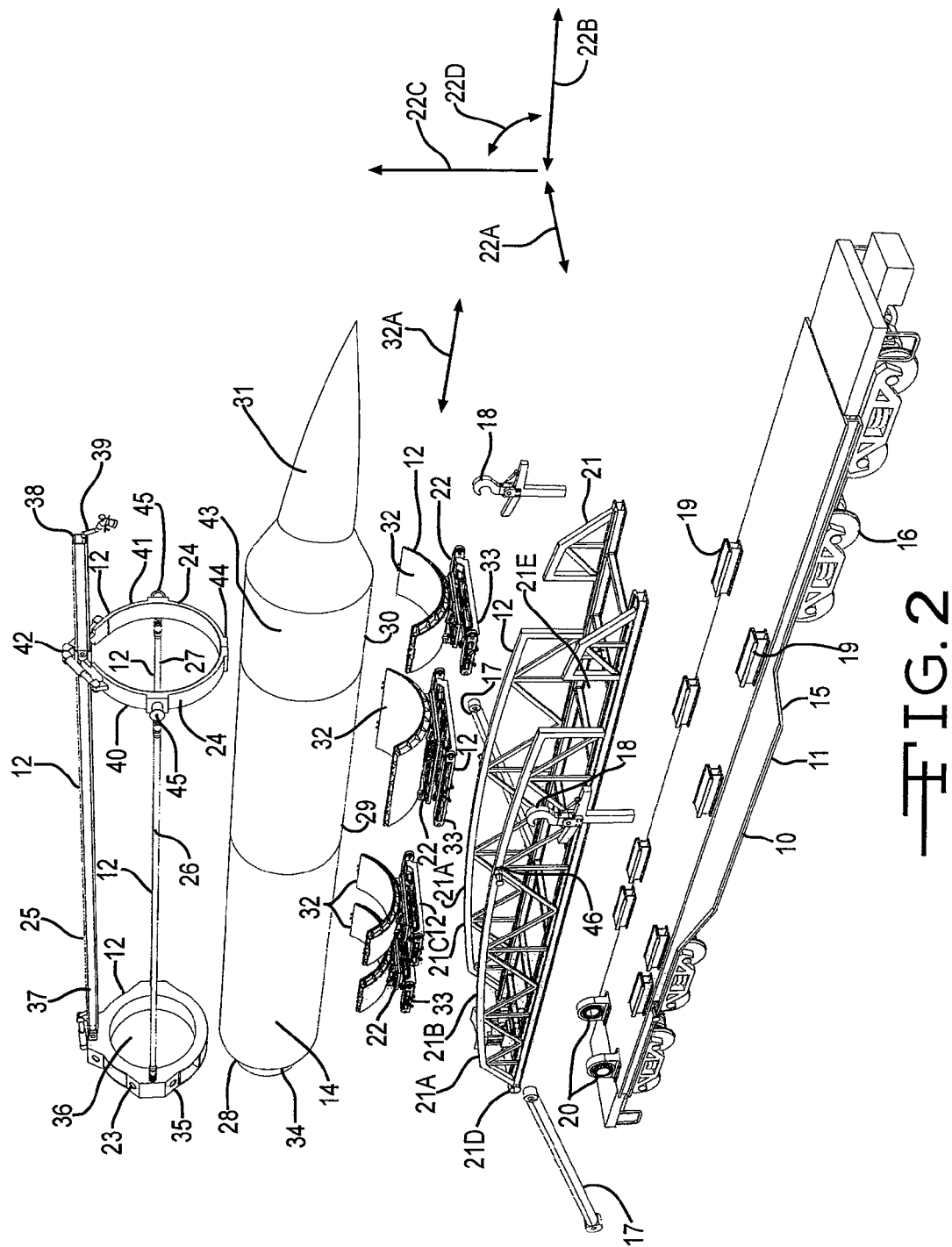
FIG. 2 shows an unassembled view of the launch-device carrying apparatus of FIG. 1.

FIG. 1 shows a perspective view of a launch-device carrying apparatus 10. FIG. 2 shows an unassembled view of the launch-device carrying apparatus 10 of FIG. 1. As shown in FIGS. 1 and 2, the launch-device carrying apparatus 10 may comprise: a mobile device 11; an attachment apparatus 12; and a launch device 14. The mobile device 11 may comprise a rail-car 15 having wheels 16 configured to run on a rail-track. In other embodiments, the mobile device 11 may comprise a plurality of rail-cars 15. The following components may be attached to the mobile device 11: movable members 17, which may comprise hydraulic ram arms; support members 19; and bearings 20. In other embodiments, the mobile device 11 may comprise mobile devices other than rail-cars, and other types of components may be attached.

The attachment apparatus 12, also referred to as a lifting device 12, may include: a truss device 21; stage moving devices 22; first and second attachment members 23 and 24; a support member 25; and connection members 26 and 27. In other embodiments, the lifting device/attachment apparatus 12 may include one or more of the above listed components, and/or comprise still other types of components.

The launch device 14 may comprise a plurality of connected stages 28, 29, and 30 and a connected payload/explosive 31. The launch device 14 may comprise one or more of a solid rocket engine, a pre-fueled launch vehicle, a missile, a rocket, an aircraft, an explosive, a payload, a spacecraft, or other types of launch devices.

The truss device 21 may sit freely on the support members 19 which may be fixed to the mobile device 11. The truss device 21 may comprise a plurality of interconnected truss members 21A, and may comprise connected left and right sides 21B and 21C. An end portion 21D of the truss device 21 may be pivotally connected to the bearings 20 in order to allow the truss device 21 to pivot relative to the mobile device 11 to raise the launch device 14 vertically off the mobile device 11. The stage moving devices 22 may comprise movable cradles 32 which may be configured to move and/or slide back and forth in direction 32A along an interior 21E of the truss device 21 to provide relative motion with respect to the mobile device 11. In other embodiments, the stage moving devices 22 may be configured to move in varying directions with respect to the mobile device 11.

Moving members 33 attached to the stage moving devices 22, such as wheels or other types of moving members, may be used to move, roll, and/or slide the stage moving devices 22 along the truss device 21 over the mobile device 11. Each of the stages 28, 29, and 30 of the launch device 14 may rest on a separate one or more of the stage moving devices 22. In such manner, prior to the stages 28, 29, and 30 being connected together, the stages 28, 29, and 30 may be moved relative to one another to properly align them by moving the stage moving devices 22.

The stage moving devices 22 may also be configured to move, relative to moving members 33, in horizontal direction 22A, horizontal direction 22B, vertical direction 22C, tilt direction 22D, and/or in other varying directions. This movement may occur by sliding the stage moving devices 22 along linear, contoured surfaces, and/or angled surfaces. When the stage moving devices 22 are in their desired positions, the stage moving devices 22 may be locked in place using locking mechanisms such as bolts or other devices. In such manner, prior to the stages 28, 29, and 30 being connected together, the stages 28, 29, and 30 may be moved in one or more of directions 22A, 22B, 22C, and 22D, to properly align them, by moving the stage moving devices 22.

An end 34, which may comprise a propulsion end, of the launch device 14 may be disposed against the first attachment member 23 which may comprise a ring member 35 defined by a hole 36. The propulsion end 34 of the launch device 14 may rest against the ring member 35, with part of the propulsion end 34 extending through the hole 36. The first attachment member 23 may be attached to the truss device 21 using bolts, pins, hooks, and/or other locking mechanisms, which may also be adapted to detach the first attachment member 23 from the truss device 21. The support member 25 may extend between and be connected to the first and second attachment members 23 and 24 to hold them apart from one another. The support member 25 may comprise an elongated member 37 defined by an inner shaft 38 extending along and within the support member 25. Wiring 39 and/or other electrical components may be run through the inner shaft 38 of the support member 25 and may run to the launch device 14.

The second attachment member 24 may comprise articulating first and second arm members 40 and 41 which are adapted to pivot/articulate relative to and/or around the support member 25. The articulating first and second arm members 40 and 41 may be connected to the support member 25 and/or to each other by pivoting means 42 such as a hinge. In such manner, the first and second arm members 40 and 41 may be pivoted into an open position to dispose the open first and second arm members 40 and 41 around end 43 of the launch device 14, and then closed and locked together around end 43 of the launch device 14, to form a ring, using locking means 44. The locking means 44 may be adapted to lock and unlock the first and second arm members 40 and 41 from each other.

Connection members 26 and 27 may each be attached at one end to the first attachment member 23, and at their other end to one of the first and second arm members 40 and 41 of the second attachment member 24. As the first and second arm members 40 and 41 pivot, the connection members 26 and 27 may move with the first and second arm members 40 and 41 to provide support. The connection members 26 and 27 may comprise elongated rods.

Hooks 18 may be attached to the truss device 21. The hooks 18 may be pivoted to lock to pins 45 of the first and second arm members 40 and 41 in order to lock the first and second arm members 40 and 41 in place relative to the truss device 21. The movable members 17 attached to the mobile device 11, which may comprise hydraulic ram arms, may be pivoted and secured to pins 46 of the truss device 21.

Figure 3:
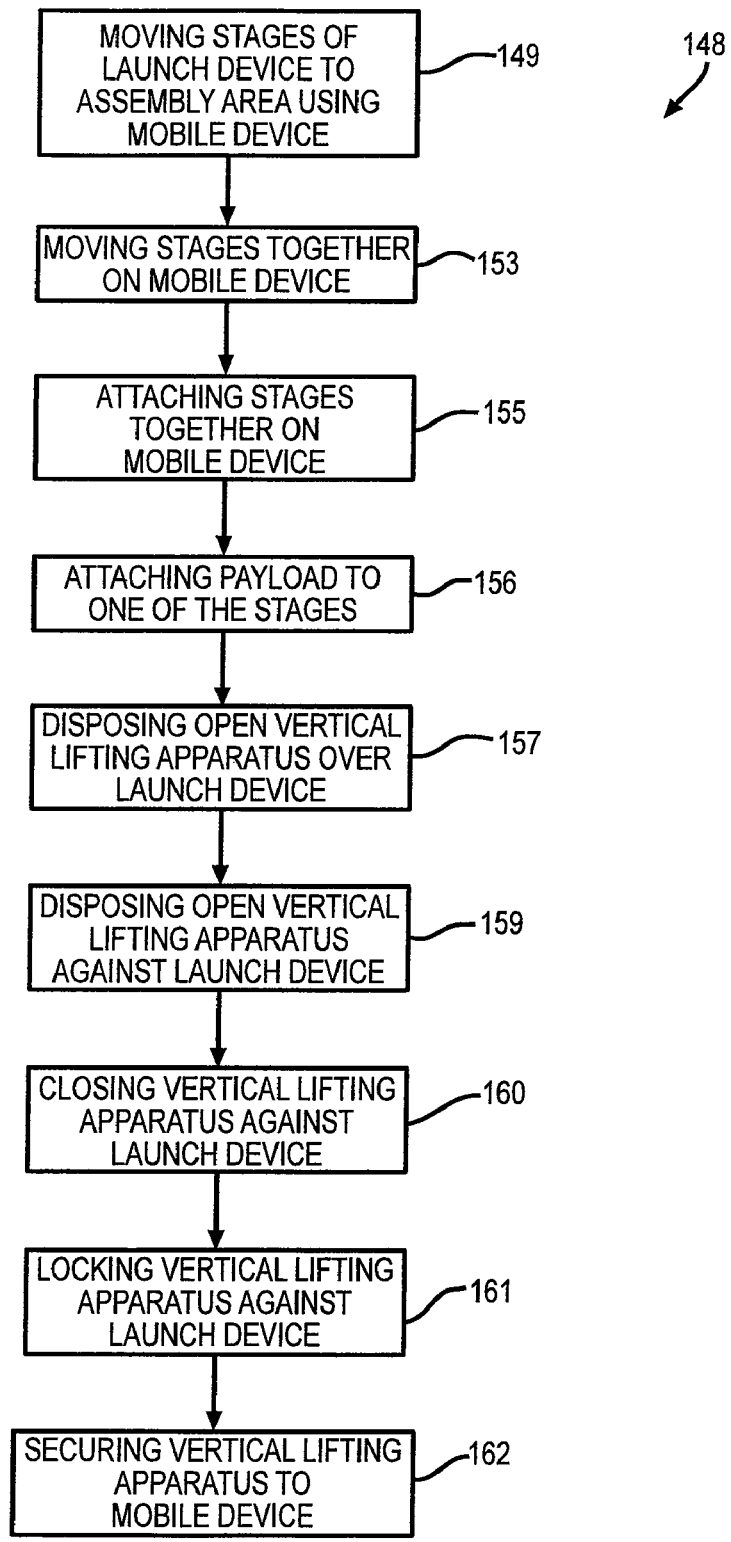
FIG. 3 shows a flow-chart of one embodiment of a method of assembling stages of a launch device.

FIG. 3 shows a flow-chart of one embodiment of a method 148 of assembling stages 28, 29, and 30 of a launch device 14. In step 149 of method 148, as shown in the perspective view of FIG. 4, a plurality of unassembled/unattached stages 28, 29, and 30 of a launch device 14 may be moved to/towards an assembly area 50 using mobile device 11, which may comprise a railcar moving on tracks. In other embodiments, a plurality of mobile devices 11 may be used. The unassembled stages 28, 29, and 30 may be disposed horizontally along direction 51 on separate stage moving devices 22 disposed on the mobile device 11. Straps 52 may be attached over each of the unassembled stages 28, 29, and 30 to opposite sides of the truss device 21 to hold the unassembled stages 28, 29, and 30 in place.

Figure 5:
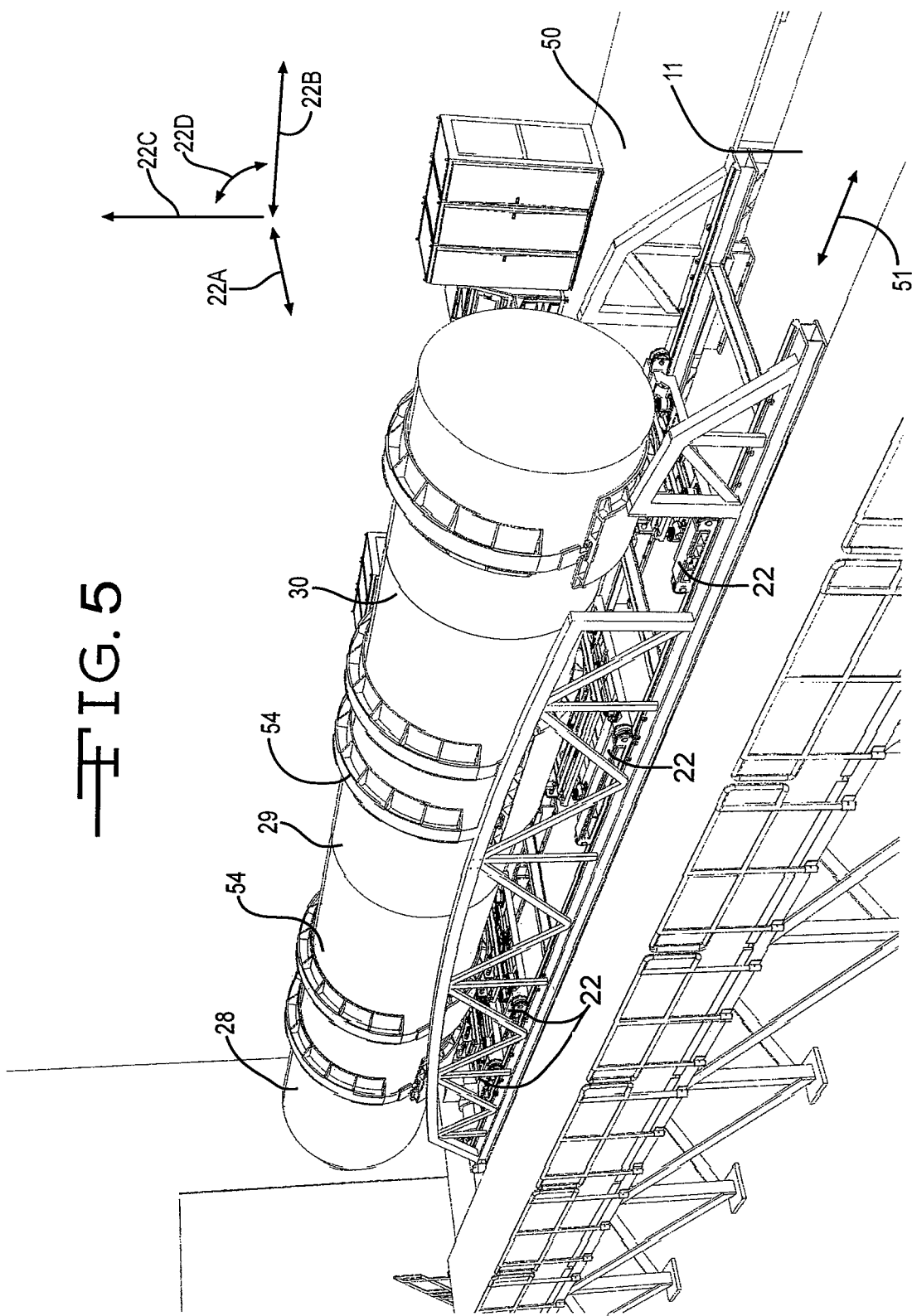
FIG. 5 shows a perspective view of the unassembled stages of the launch device of FIG. 4 being moved together at the assembly area into a horizontal position on the mobile device under one of the steps of the method of FIG. 3.

In step 153 of method 148, as shown in the perspective view of FIG. 5, the unassembled stages 28, 29, and 30 may be moved together at the assembly area 50 in a horizontal position on the mobile device 11. This step may comprise moving and/or rolling the stage moving devices 22 horizontally along direction 51 on and relative to the mobile device 11 in order to align the stages 28, 29, and 30 in contact with one another horizontally so that they may be attached to assemble the launch device 14. The positions and/or orientations of the stage moving devices 22 may be adjusted along one or more of horizontal direction 22A, horizontal direction 22B, vertical direction 22C, tilt direction 22D, and/or in other varying directions in order to align the stages 28, 29, and 30 properly. Connections 54 may be made between the stages 28, 29, and 30. The connections 54 may comprise one or more of electrical wiring connections, circuitry connections, electrical connections, computer connections and/or other types of connections between the stages 28, 29, and 30 to integrate the stages of the mobile device 11 together. The connections 54 may be tested prior to attaching the stages 28, 29, and 30 together.

Figure 6:
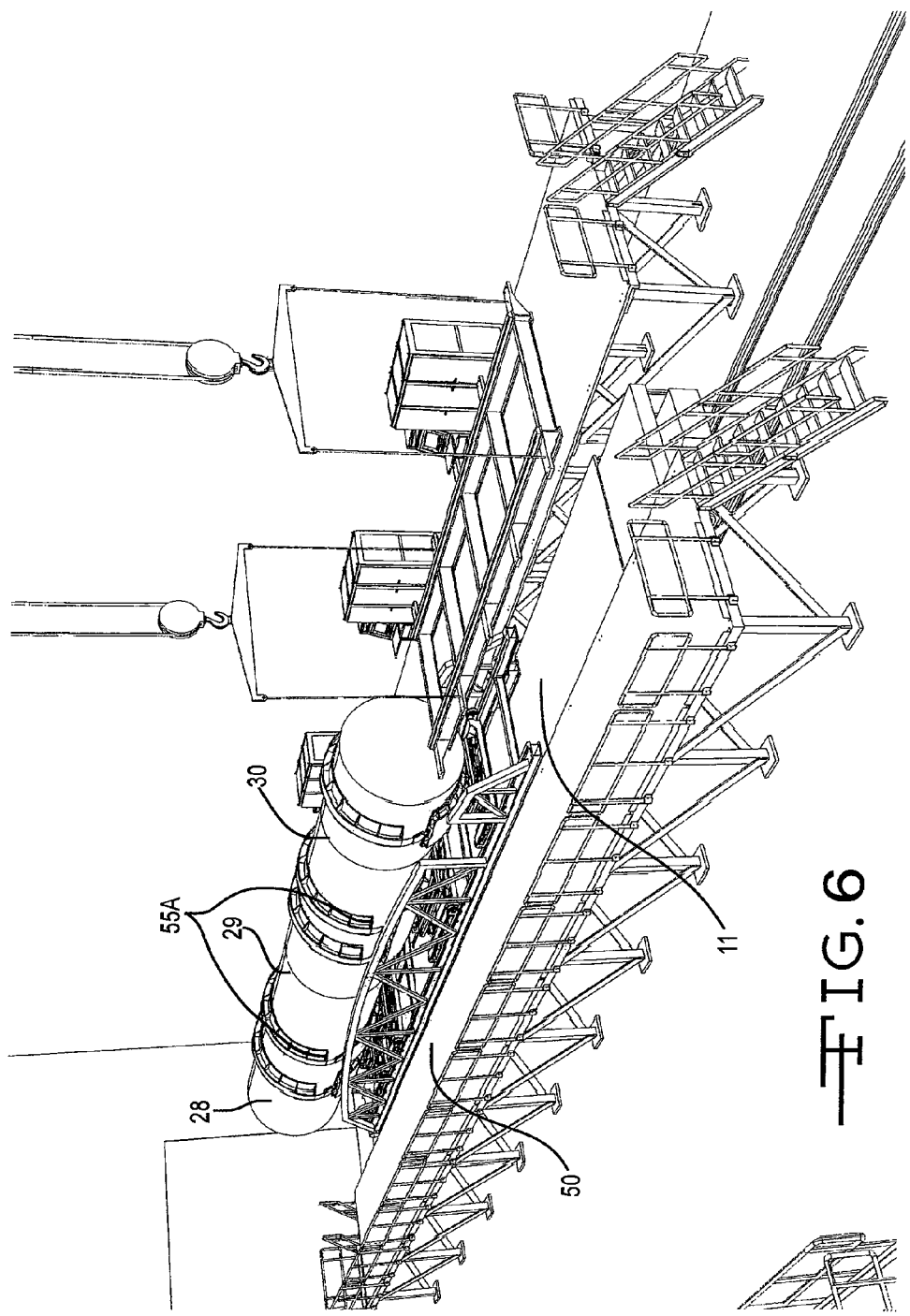
FIG. 6 shows a perspective view of the unassembled stages of FIG. 5 being attached together in the assembly area in a horizontal position on the mobile device under one of the steps of the method of FIG. 3.

In step 155 of method 148, as shown in the perspective view of FIG. 6, the unassembled stages 28, 29, and 30 may be attached together in the assembly area 50 in a horizontal position on the mobile device 11. The stages 28, 29, and 30 may be attached using connectors 55A comprising one or more of bolts, snap-means, pins, and/or other types of connectors.

Figure 7:
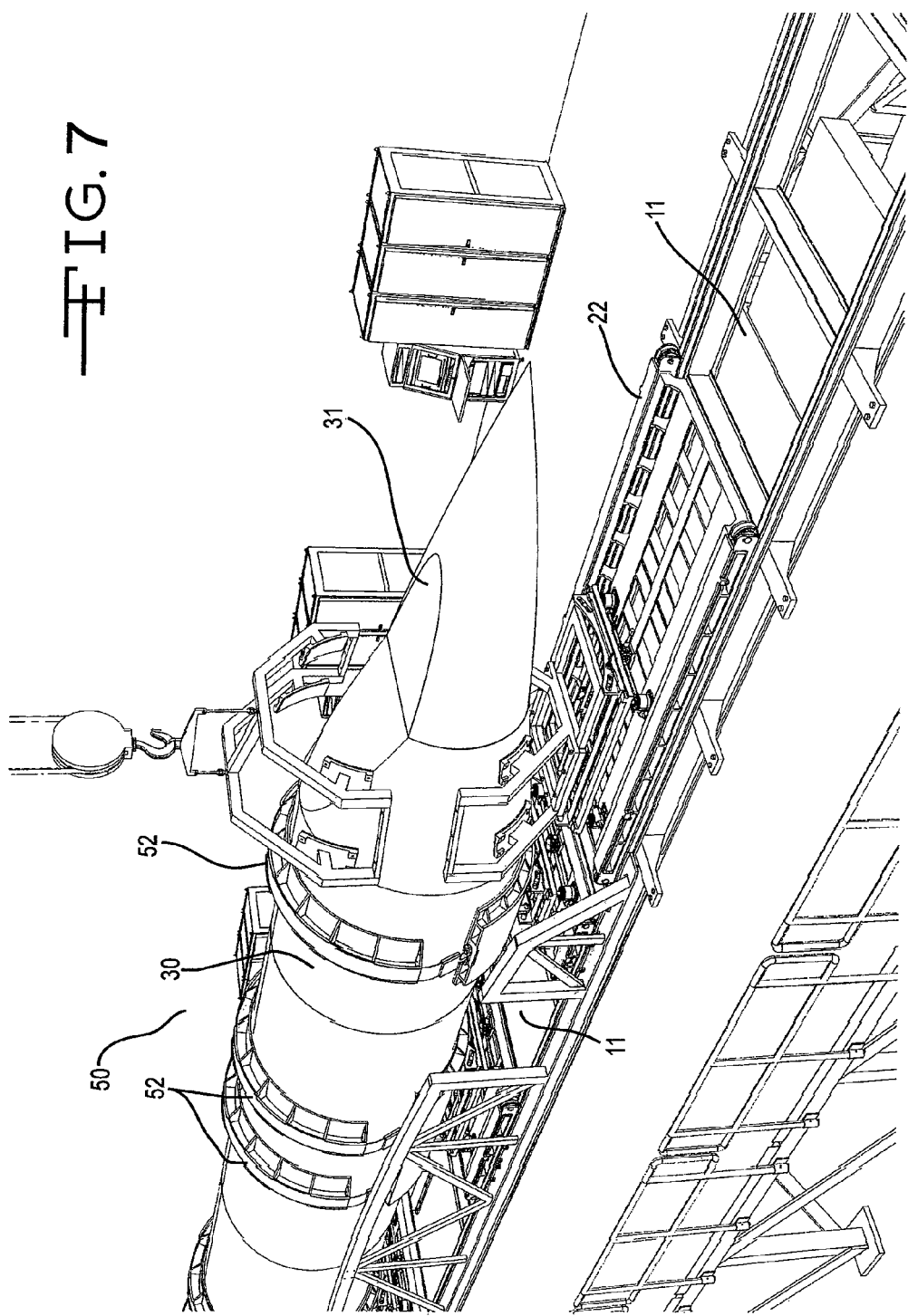
FIG. 7 shows a perspective view of a payload, such as an explosive, and/or another device, being aligned with and horizontally attached to one of the assembled stages of the launch device of FIG. 6 under one of the steps of the method of FIG. 3.

In step 156 of method 149, as shown in the perspective view of FIG. 7, a payload 31 such as an explosive, and/or another device may be aligned with and horizontally attached to stage 30. The payload 31 may have arrived at the assembly area 50 on a stage moving device 22 attached to another mobile device 11. The stage moving device 22 may be moved in varying directions, orientations, and/or configurations in order to align the payload 31 with the stage 30 to attach the payload. The straps 52 may then be removed from the connected stages 28, 29, and 30 of the launch device 14.

Figure 8:
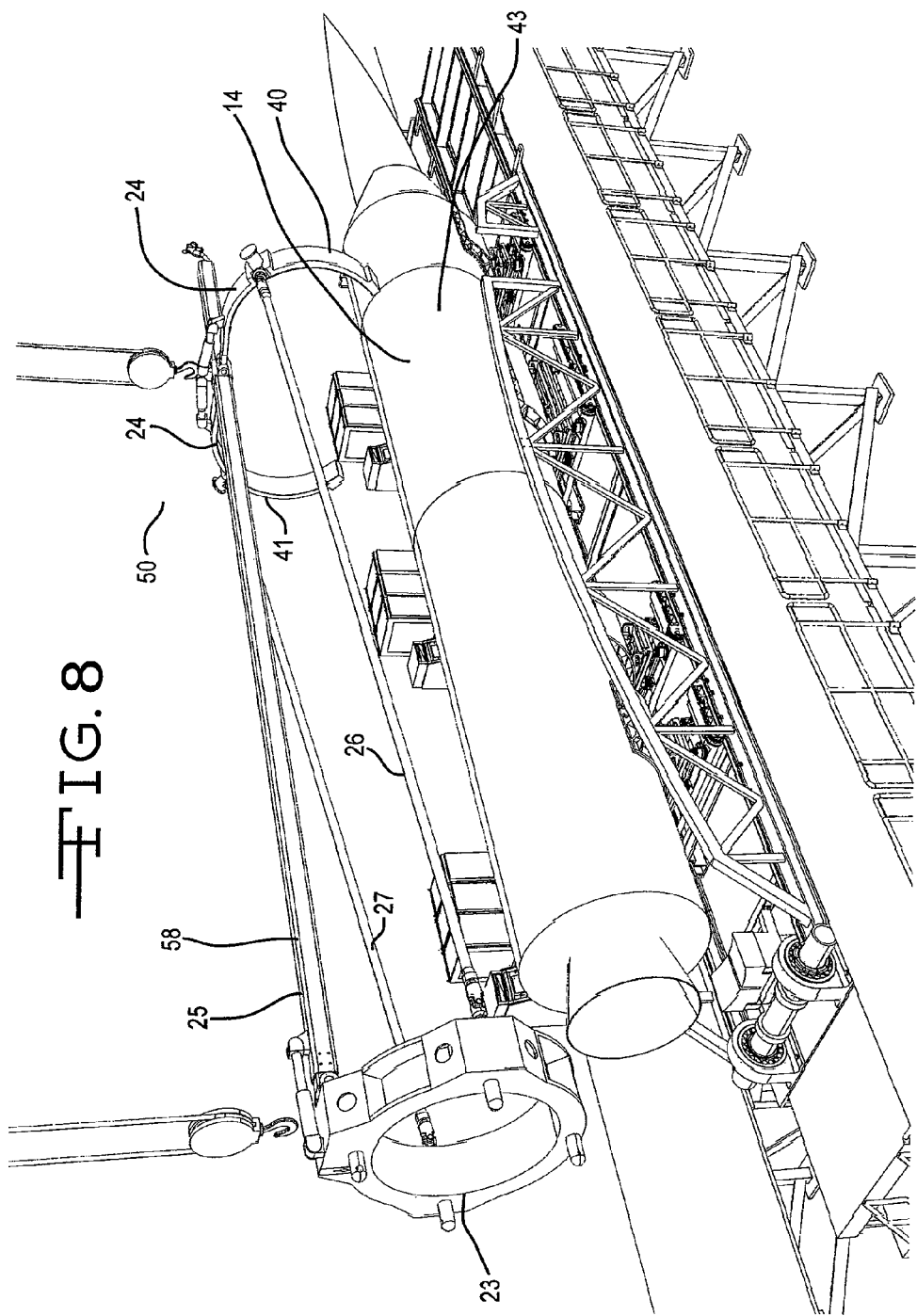
FIG. 8 shows a perspective view of a vertical lifting apparatus being disposed and/or aligned over the launch device of FIG. 7 under one of the steps of the method of FIG. 3.

In step 157 of method 149, as shown in the perspective view of FIG. 8, a vertical lifting apparatus 58 may be disposed and/or aligned over the launch device 14. The vertical lifting apparatus 58 may have been moved to the assembly area 50 using another mobile device. The vertical lifting apparatus 58 may comprise the first and second attachment members 23 and 24, support member 25, and connection members 26 and 27. In other embodiments, the vertical lifting apparatus 58 may comprise varying components. Step 157 may further comprise disposing open first and second arm members 40 and 41 of the second attachment member 24 over end 43 of the launch device 14.

In step 159 of method 149, as shown in the perspective view of FIG. 9, the vertical lifting apparatus 58 may be disposed against the launch device 14. Step 159 may comprise disposing the open first and second arm members 40 and 41 of the second attachment member 24 around end 43 of the launch device 14, and disposing the propulsion end 34 of the launch device 14 against the first attachment member 23.

In step 160 of method 149, the vertical lifting apparatus 58 may be put into a closed position against the launch device 14. As shown in the perspective view of FIG. 10, step 160 may comprise closing the first and second arm members 40 and 41 of the second attachment member around end 43 of the launch device 14.

In step 161 of method 149, the vertical lifting apparatus 58 may be locked against the launch device 14. As shown in FIG. 11, step 161 may comprise locking the first and second arm members 40 and 41 of the second attachment member around end 43 of the launch device 14 using a locking member 41A, and/or locking the propulsion end 34 of the launch device 14 against the first attachment member 23 utilizing a locking member 34A, such as stops, pins, hooks, bolts, and/or other types of locking mechanisms. FIG. 11A shows an enlarged view within ellipse 11A shown in FIG. 11. This view shows the locking of arm members 40 and 40 around end 43 of launch device 14 using locking device 41A.

Figure 12:
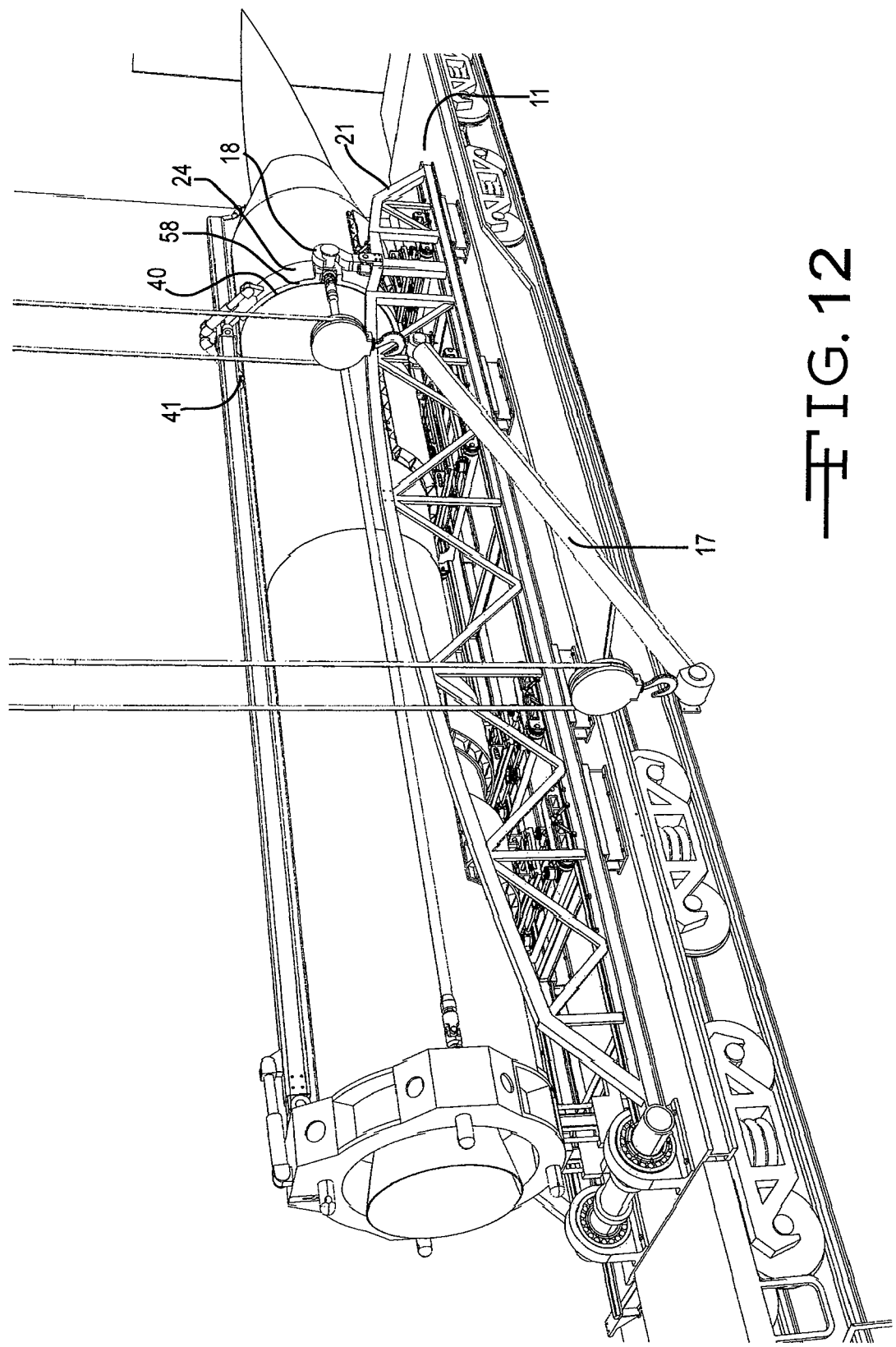
FIG. 12 shows a perspective view of the vertical lifting apparatus of FIG. 11 being secured to the mobile device.

In step 162 of method 149, the vertical lifting apparatus 58 may be secured to the mobile device 11. As shown in FIG. 12, step 162 may comprise securing the hooks 18 attached to the truss device 21 to the first and second arm members 40 and 41 of the second attachment member 24, and/or securing the movable members 17 attached to the mobile device 11 to the truss device 21.

Figure 13:
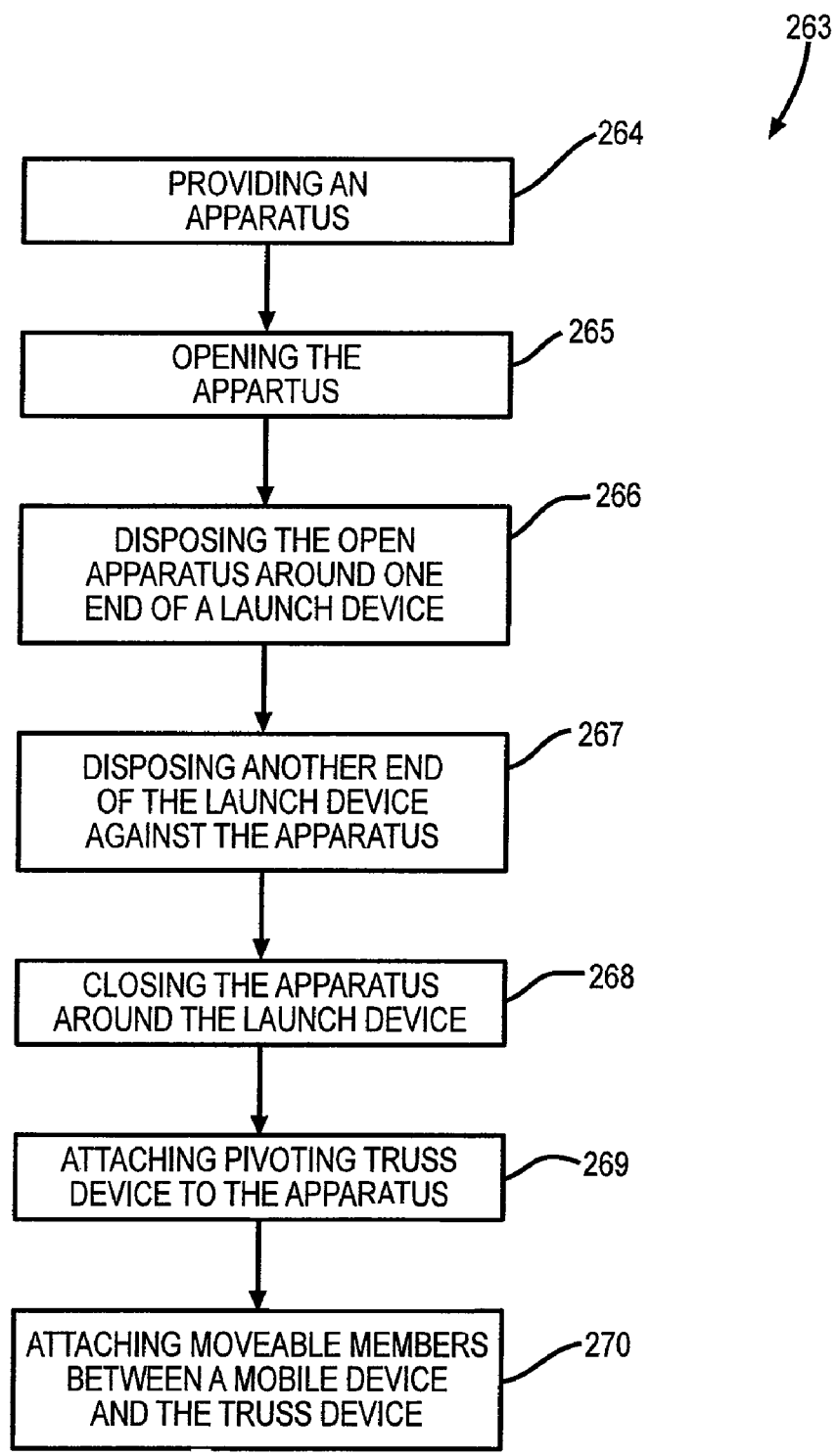
FIG. 13 shows a flowchart of one embodiment of a method for attaching an apparatus to a launch device.

FIG. 13 shows a flowchart of a method 263 for attaching an apparatus 12 to a launch device 14. In one step 264, the apparatus 12 may be provided. The apparatus 12 may comprise any of the embodiments disclosed herein. In another step 265, first and second articulating arm members 40 and 41 of a second attachment member 24 of the apparatus 12 may be opened by pivoting the first and second articulating members 40 and 41 about a support member 25 as shown in FIG. 8. In an additional step 266, the open first and second articulating arm members 40 and 41 may be disposed around one end 43 of the launch device 14 as shown in FIG. 9. In still another step 267, another end 34, such as a propulsion end, of the launch device 14 may be disposed against a first attachment member 23 as shown in FIG. 9.

In yet another step 268, the first and second articulating arm members 40 and 41 may be closed around end 43 of the launch device 14 to form a ring as shown in FIG. 10. Step 268 may further comprise locking the first and second articulating members 40 and 41 together around end 43 of the launch device 14 as shown in FIG. 11. In yet another step 269, a pivoting truss device 21 may be attached to the first and second attachment members 23 and 24 using hooks 18 as shown in FIG. 12. In an additional step 270, one or more movable members 17 attached to a mobile device 11 may be attached to the truss device 21 as shown in FIG. 12.

Figure 14:
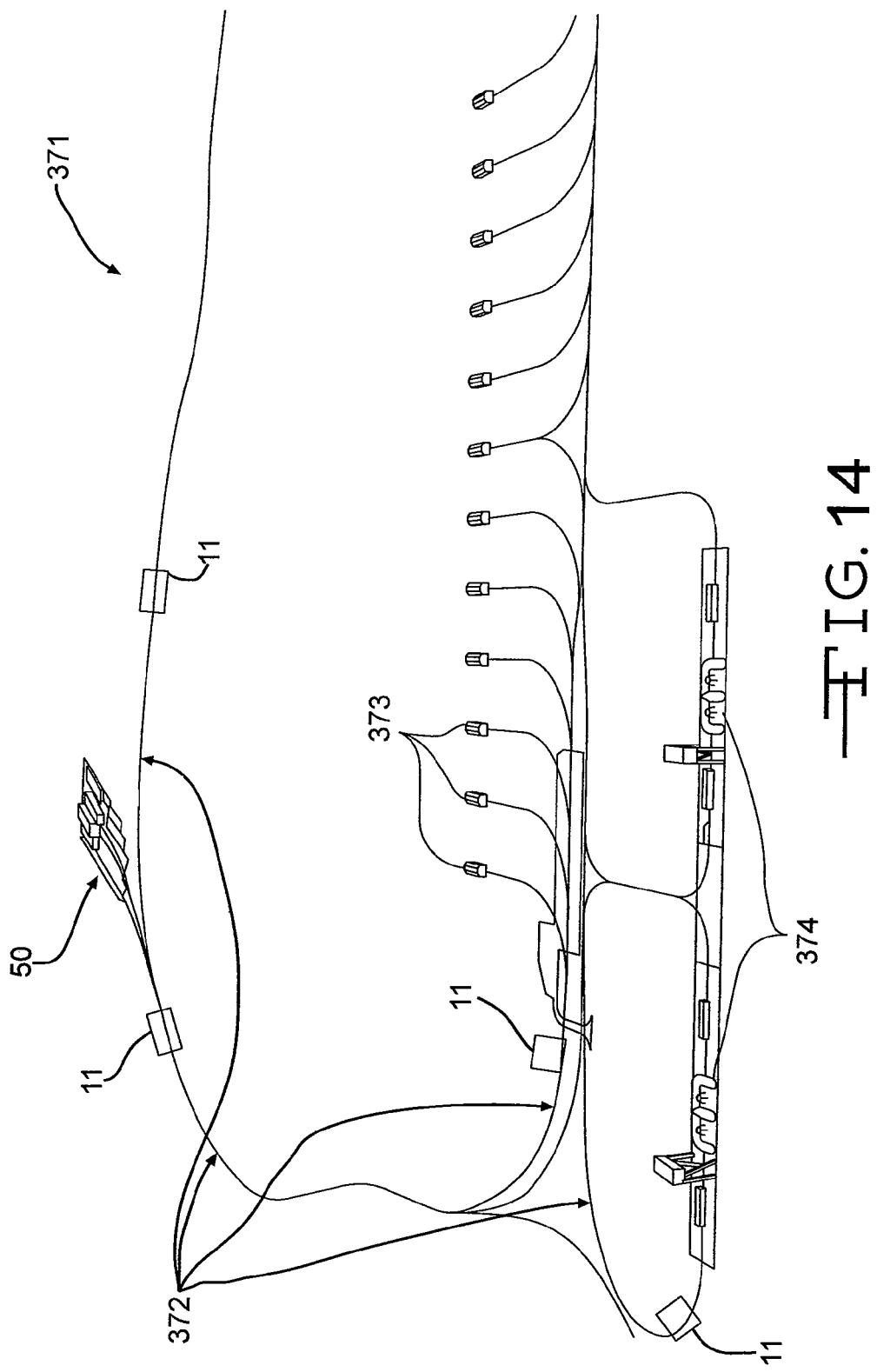
FIG. 14 shows a perspective view of one embodiment of an infrastructure which may be used to implement the disclosure.

FIG. 14 shows a perspective view of an infrastructure 371 which may be used to implement the disclosure. The infrastructure 371 may include: an assembly area 50; a transport path 372; storage areas 373; and launch sites 374. The assembly area 50 may be used to assemble launch devices 14 delivered to the assembly area 50 with the mobile devices 11. The mobile devices 11 may follow the transport path 372, which may comprise a rail-track or other type of path. After the launch devices 14 are assembled in the assembly area 50, the mobile devices 11 may follow the transport path 372 to the storage areas 373 where the launch devices 14 may be stored until needed. The storage areas 373 may comprise storage bunkers or other types of storage areas. When the launch devices 14 are required to be launched, the mobile devices 11 may follow the transport path 373 from the storage areas 373 to the launch sites 374 where the launch devices 14 may be launched. The launch sites 374 may comprise one or more of a launch platform, a raised launch platform, a launch coffin, and/or other types of launch sites.

Figure 4:
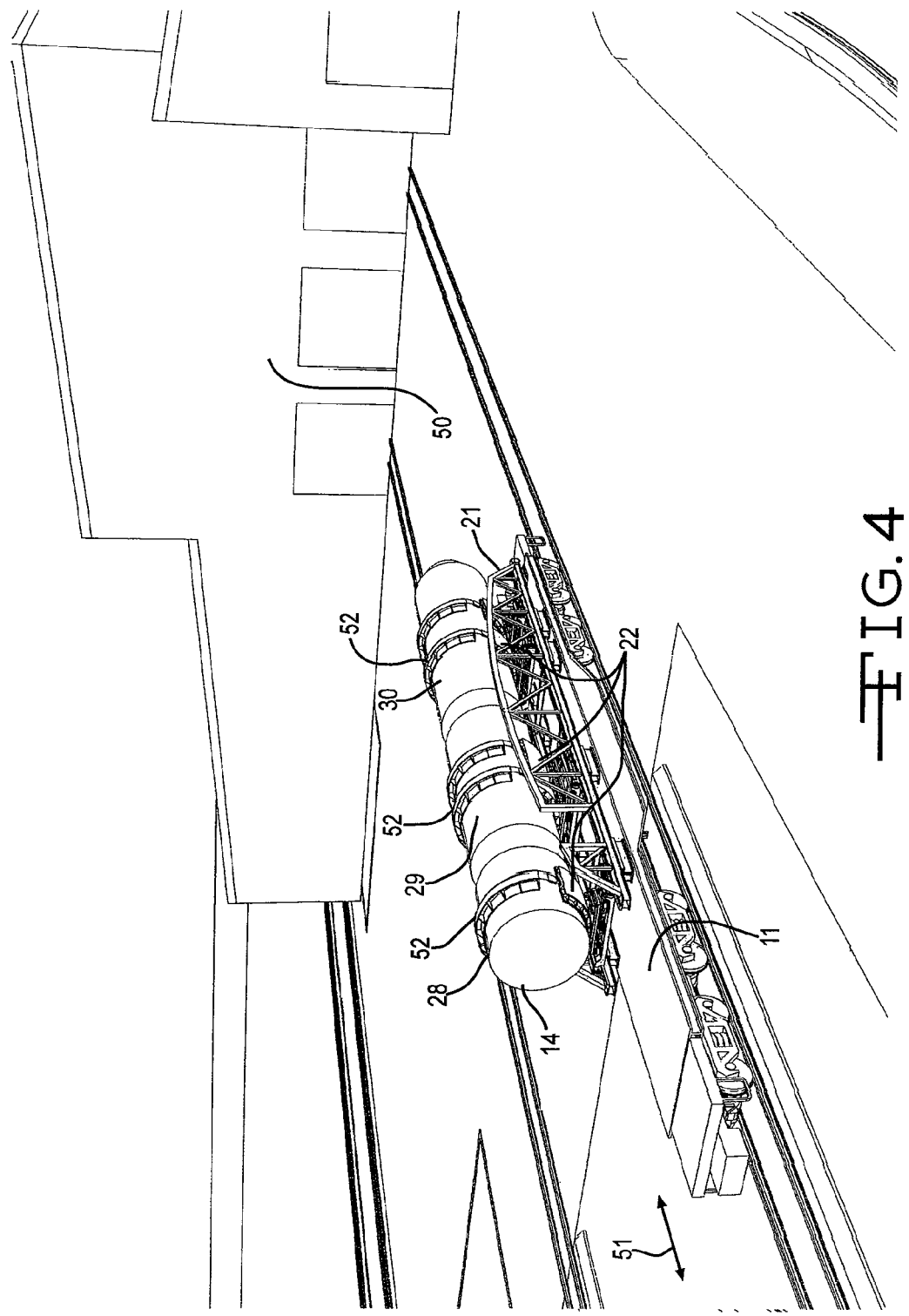
FIG. 4 shows a perspective view of a plurality of unassembled/unattached stages of a launch device being moved to an assembly area using a mobile device under one of the steps of the method of FIG. 3.
Figure 15:
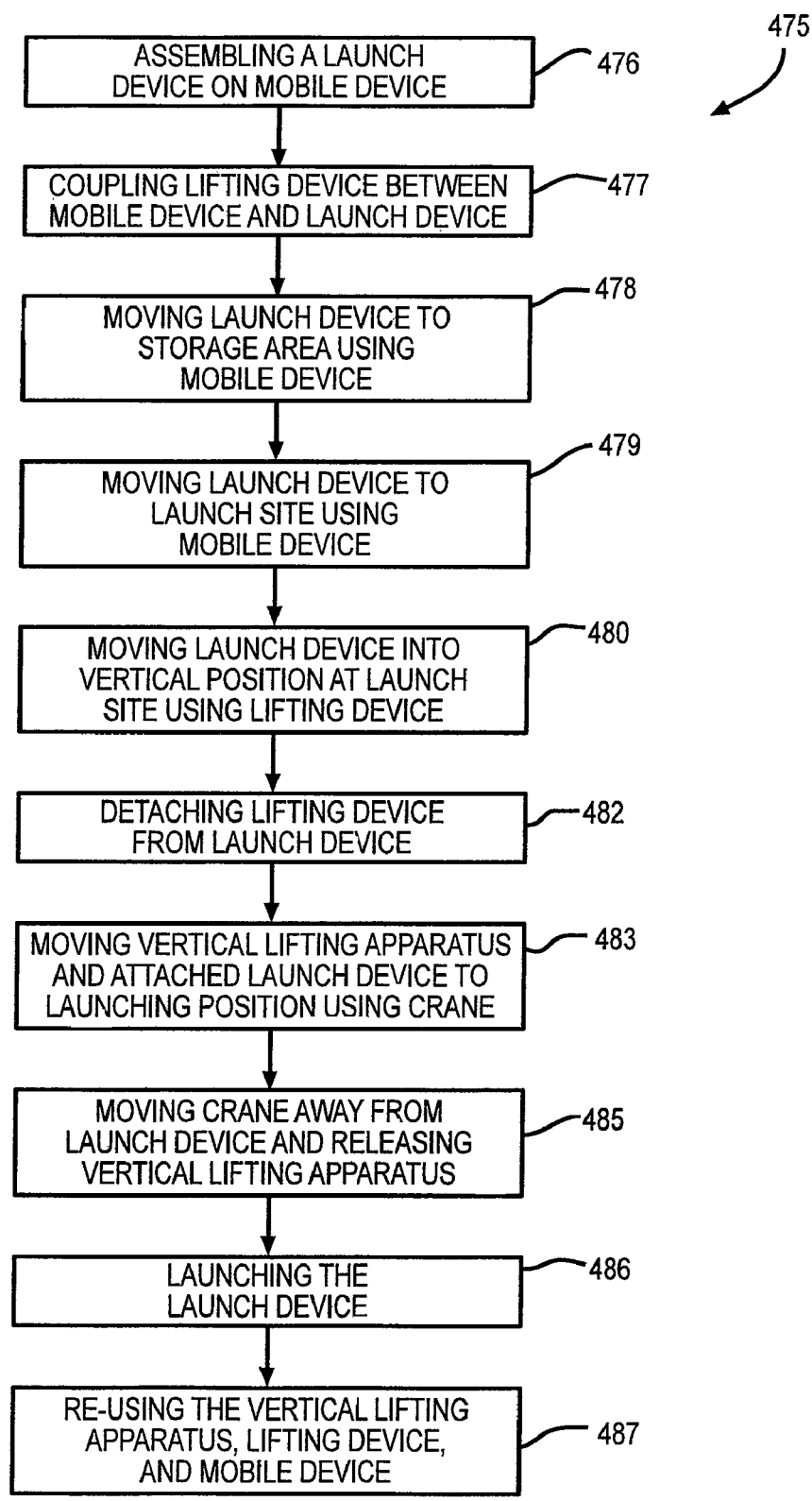
FIG. 15 shows a flowchart of one embodiment of a method for preparing a launch device.

FIG. 15 shows a flowchart of one embodiment of a method 475 for preparing a launch device 14. In step 476, a launch device 14 may be assembled in a horizontal position on a mobile device 11 as shown in FIGS. 5-7. The unassembled stages 28, 29, and 30 of the launch device 14 may have been delivered to an assembly area 40 by the mobile device 11 as shown in FIG. 4 by following the transport path 372 of FIG. 14. Step 476 may include any of the assembly steps and/or apparatus disclosed herein. For instance, step 476 may comprise moving and attaching a plurality of stages 28, 29, and 30 of the launch device 14 together horizontally using one or more stage moving devices 22 as shown in FIGS. 5-7.

In step 477, a lifting device 12 attached to the mobile device 11 may be coupled to the launch device 14 as shown in FIGS. 8-12. Step 477 may include any of the attaching steps and/or apparatus disclosed herein. For instance, step 477 may comprise, as shown in FIGS. 8-12, attaching a vertical lifting apparatus 58 to the launch device 14, and attaching a pivoting truss device 21 attached to the mobile device 11 to the vertical lifting apparatus 58, all while the launch device 14 is kept in a horizontal position on the mobile device 11.

In step 478, the launch device 14 may be moved to a storage area 373 as shown in FIG. 14 using the mobile device 11. Step 478 may comprise the mobile device 11, as shown in FIG. 14, following the transport path 372 from the assembly area 40 to the storage area 373 while keeping the launch device 14 in a horizontal position on the mobile device 11. In step 479, as shown in FIG. 14, the launch device 14 may be moved to a launch site 374 using the mobile device 11. Step 479 may comprise the mobile device 11 following the transport path 372 of FIG. 14 from the storage area 373 to the launch site 374, while keeping the launch device 14 in a horizontal position on the mobile device 11.

Figure 16:
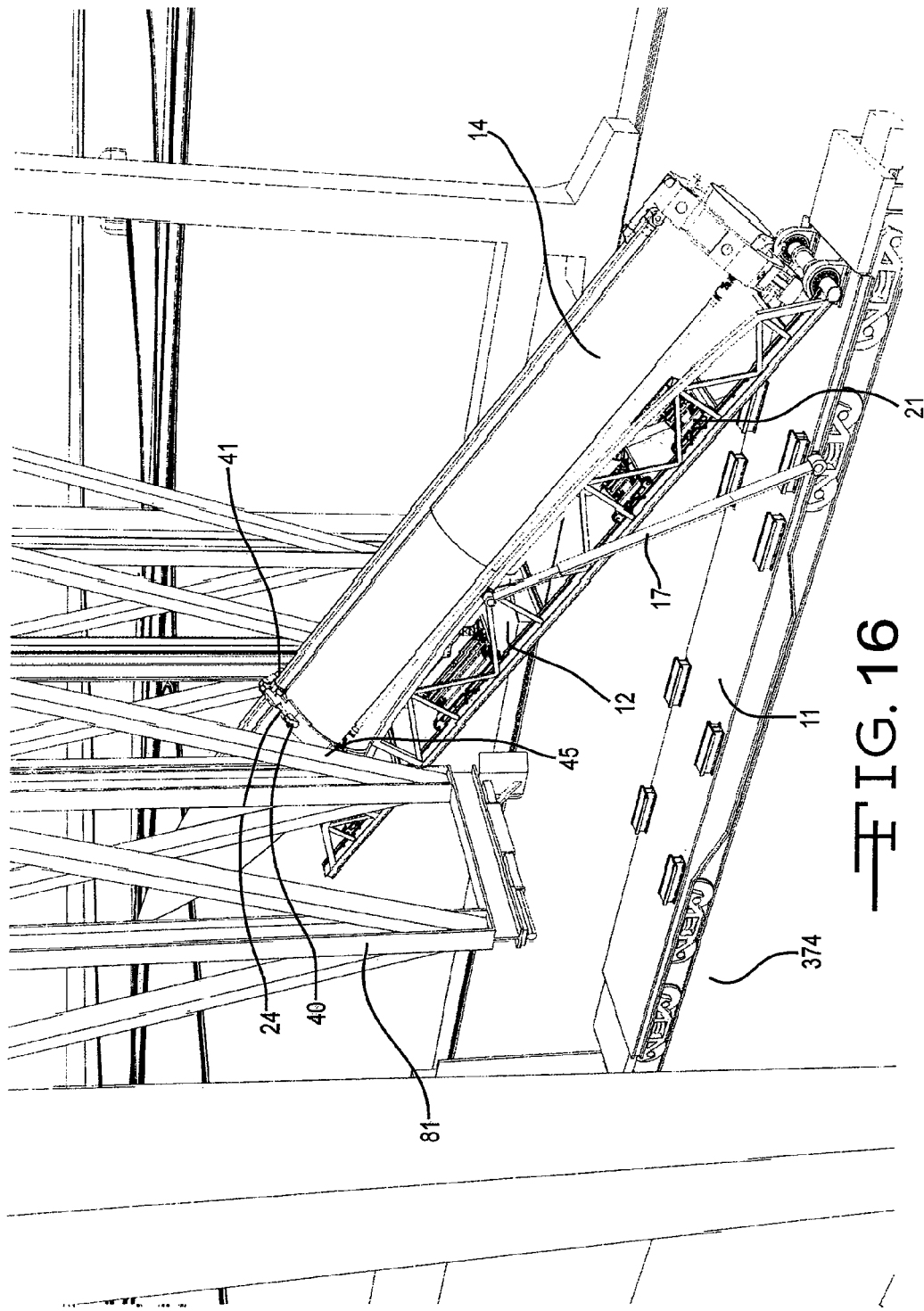
FIG. 16 shows a perspective view of a launch device being moved towards a vertical position at a launch site using a lifting device and a crane under one step of the method of FIG. 15.
Figure 17:
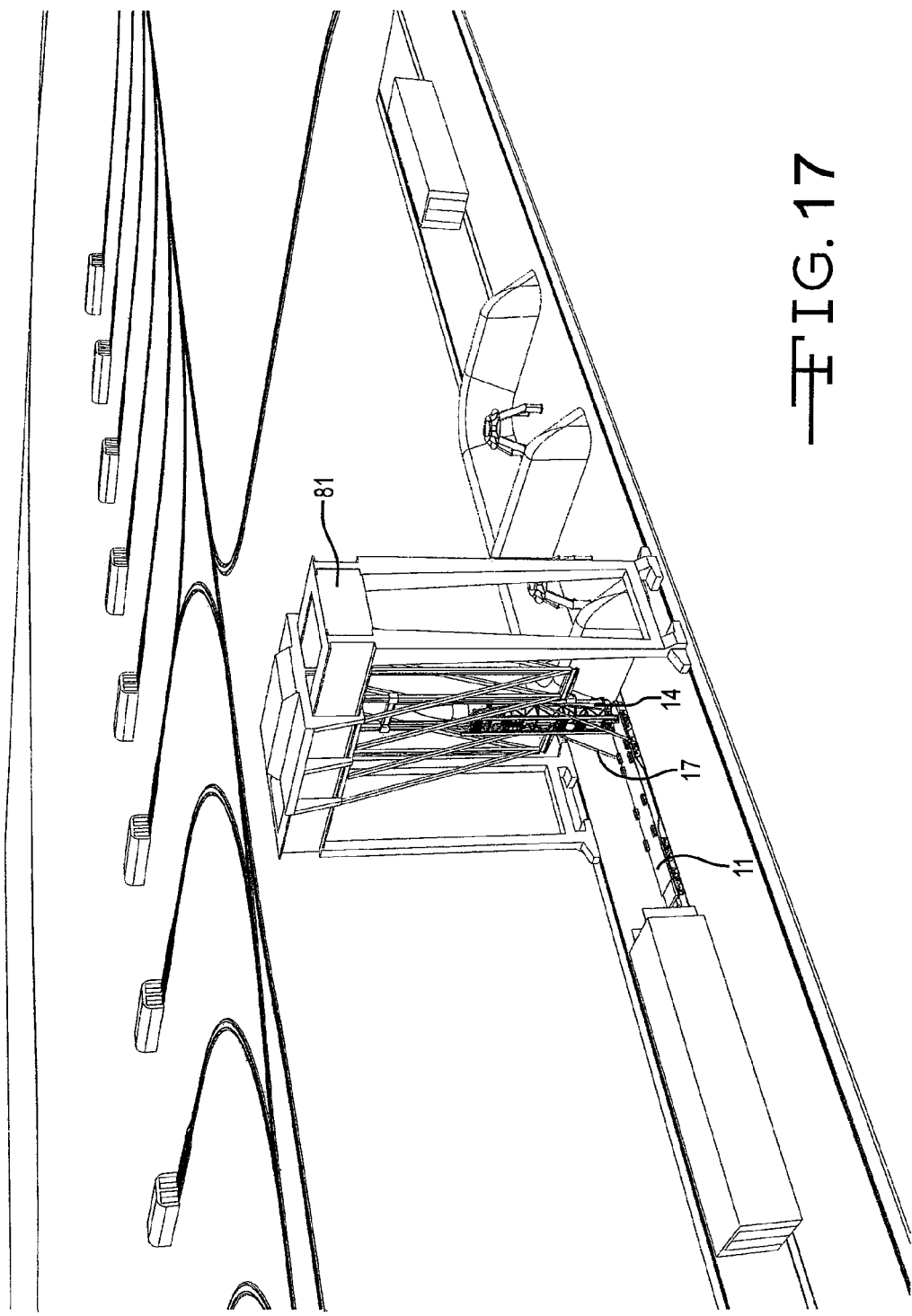
FIG. 17 shows a perspective view of the crane of FIG. 16 in an upright position with the lifting device and the launch device positioned vertically over a mobile device under one step of the method of FIG. 15.

In step 480, the launch device 14 may be moved to a vertical position at the launch site 374 using the lifting device 12. FIG. 16 shows a perspective view of one embodiment of moving the launch device 14 to a vertical position at the launch site 374 using the lifting device 12 and a crane 81, which is shown in an intermediate lifting position. As shown, the crane 81 may be attached to pins 45 of first and second arms 40 and 41 of the second attachment member 24 of the lifting device 12. The crane 81 may lift one end of the lifting device 12 vertically away from the mobile device 11 as a trust device 21 of the lifting device 12 pivots around the mobile device 11, and the movable members 17, attached to the trust device 21 and the mobile device 11, rotate to provide support to the raised mobile device 11 and trust device 21. FIG. 17 shows a perspective view of the crane 81 of FIG. 16 in a completely raised position with the trust device 21 raised and the launch-device 14 positioned vertically over the mobile device 11.

Figure 18:
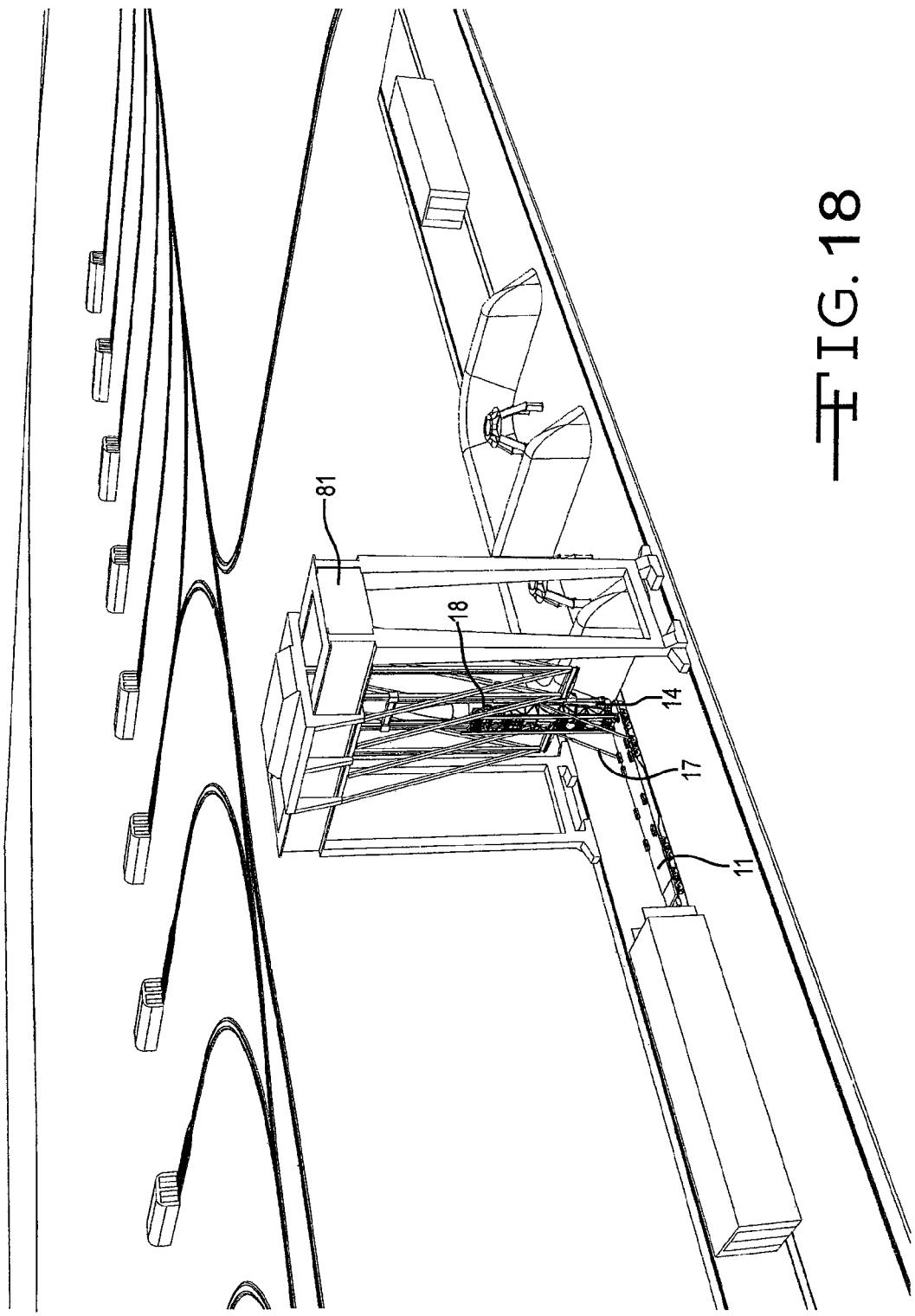
FIG. 18 shows a perspective view of releasing a raised truss device of the lifting device of FIG. 17 from a vertical lifting apparatus attached to the launch device under one step of the method of FIG. 15.

In step 482, the lifting device 12, or at least a portion of the lifting device 12, may be detached from the launch device 14 prior to launch. In one embodiment, step 482 may comprise, as shown in the perspective view of FIG. 18, releasing the hooks 18 attached to the raised truss device 21 of FIG. 17 from the pins 45 of the first and second arms 40 and 41 of the vertical lifting apparatus 58. Any other attachment mechanism attaching the truss device 21 to the vertical lifting apparatus 58 may also be released. In such manner, the vertical lifting apparatus 58 attached to the launch device 14 may be released from the pivoting raised truss device 21. The vertical lifting apparatus 58, the remaining portion of the lifting device 12, may subsequently be detached from the launch device 14 during step 485 as discussed below.

Figure 19:
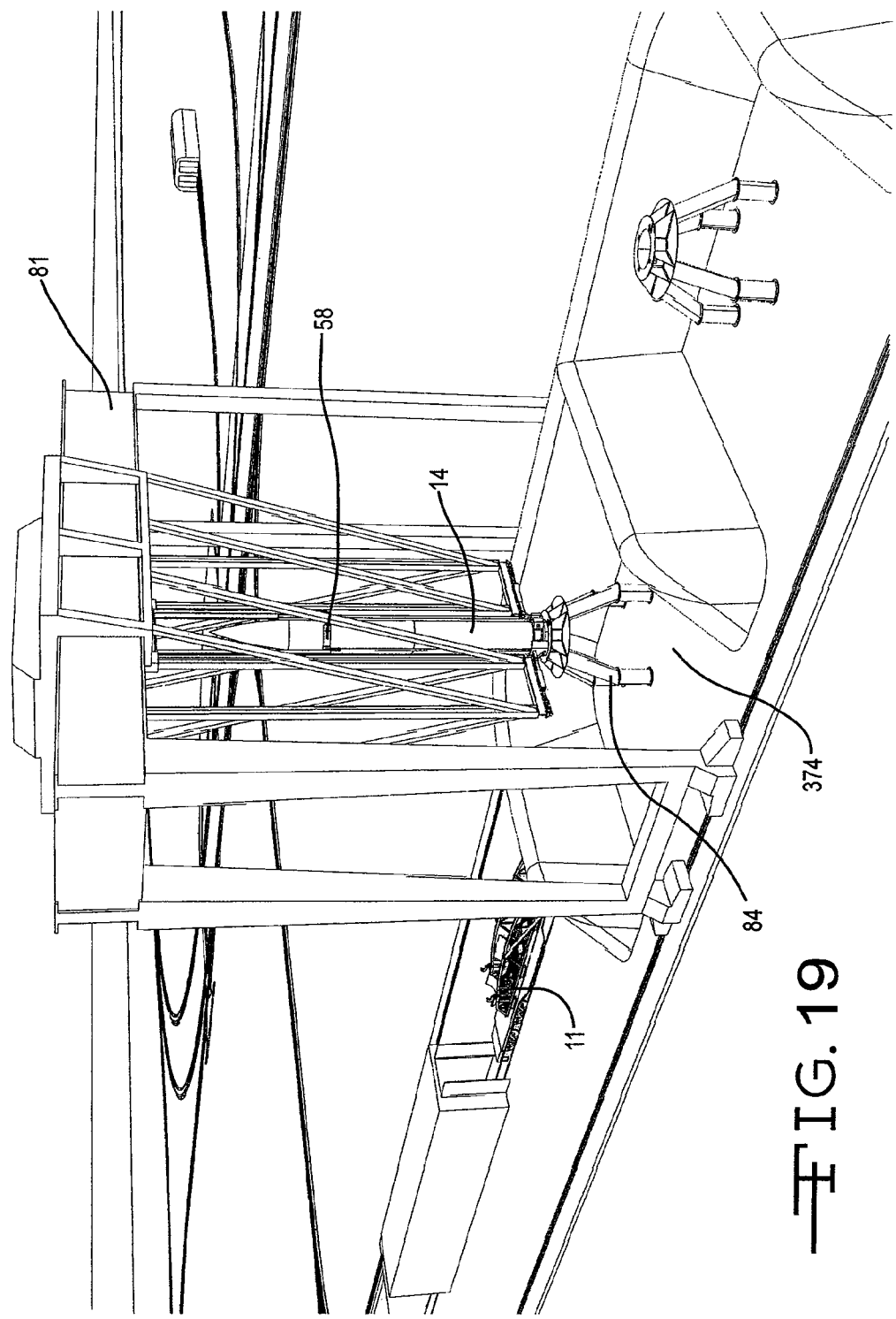
FIG. 19 shows a perspective view of the crane having moved the launch device of FIG. 18 off the mobile device to a launch platform on a launch site under one step of the method of FIG. 15.

In step 483, the vertical lifting apparatus 58 and the attached launch device 14 may be moved into a launching position at the launch site 374 using the crane 81. As shown in FIG. 19, which shows a perspective view of the crane 81 having moved the launch device 14 of FIG. 18 to a launch site 374, the crane 81 may lift the vertical lifting apparatus 58 and the attached launch device 14 off the mobile device 11 and move/dispose the launch device 14 into a launching position on a launch platform 84 at the launch site 374.

Figure 20:
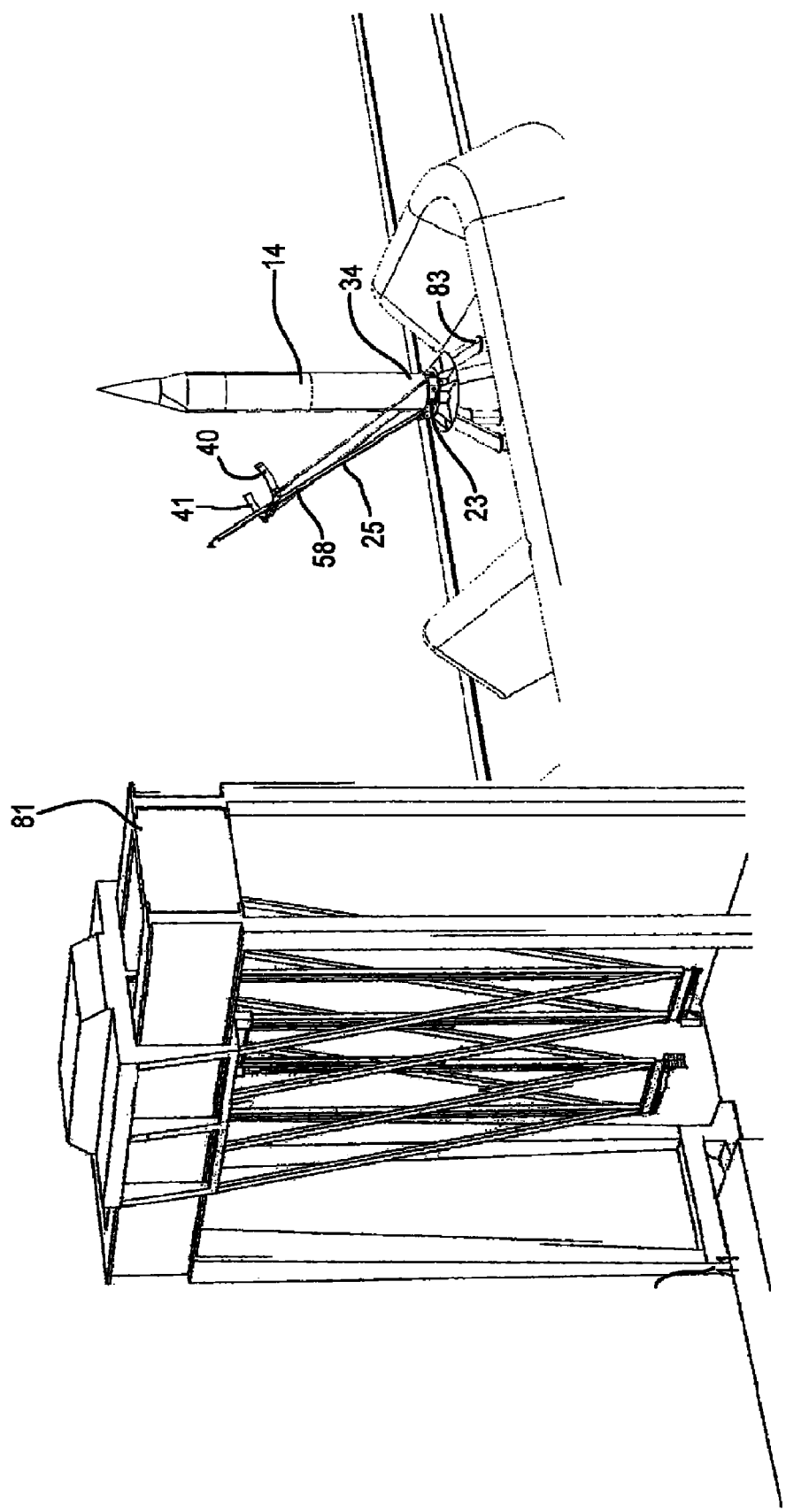
FIG. 20 shows a perspective view of the crane of FIG. 19 having been moved away from the launch device and the vertical lifting apparatus having been released from the launch device under one step of the method of FIG. 15.

In step 485, the crane 81 may be moved away from the launch device 14 and the vertical lifting apparatus 58 released from the launch device 14. As shown in FIG. 20, which shows a perspective view of the crane 81 having moved away from the launch device 14 and the vertical lifting apparatus 58 having been released from the launch device 14, the crane 81 may be detached from the vertical lifting apparatus 58 and may be moved away from the launch device 14 on the launch platform 83. The first and second arms 40 and 41 of the vertical lifting apparatus 58 may have been unlocked from one another into their open position to release the vertical lifting apparatus 58 from the launch device 14. The vertical lifting apparatus 58 may be lowered away from the launch device 14 by pivoting the support member 25 about the first attachment member 23. Any locking mechanisms securing the first attachment member 23 to the propulsion end 34 of the launch device 14 may be released.

Figure 21:
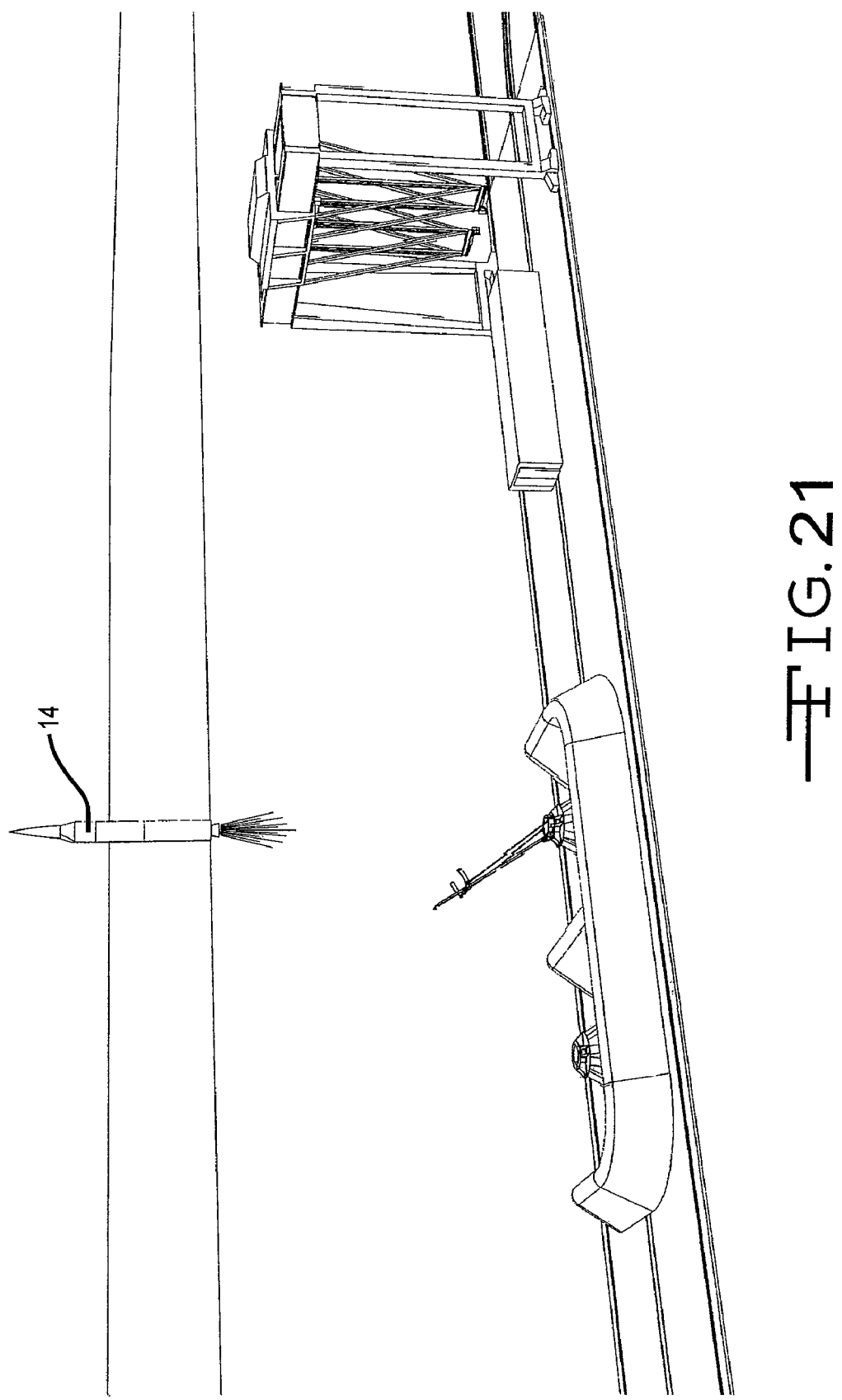
FIG. 21 shows a perspective view of the launch device of FIG. 20 having been launched under one step of the method of FIG. 15.

In step 486, as shown in FIG. 21, the launch device 14 may be launched. In step 487, the vertical lifting apparatus 58, lifting device 12, and mobile device 11 may be reused to deliver other launch devices 14 to the launch sites 374.

One or more embodiments of the disclosure may reduce one or more problems of one or more of the existing apparatus and/or methods for the preparation and/or launching of launch devices. For instance, the disclosure may provide for the transport, assembly, integration, storage, lifting, positioning, and launching of launch devices, such as solid rocket engines, pre-fueled launch vehicles, missiles, etc, using a low number of mobile devices and/or equipment, which may be (quickly reused after launch, in order to reduce time, reduce costs, improve safety, and improve efficiency while maintaining transparency of intent to avoid being confused with a nuclear strike. The launch devices may be kept in horizontal positions during transport, assembly, integration, and storage, and may not be moved to vertical positions until launch.

It should be understood, of course, that the foregoing relates to exemplary embodiments of the disclosure and that modifications may be made without departing from the spirit and scope of the disclosure as set forth in the following claims.

The invention claimed is:

1. A method of launching a launch device comprising:
   assembling a launch device in a horizontal position on a mobile device;
   attaching an attachment member to the launch device disposed in the horizontal position on the mobile device;
   attaching a truss device, rotate-ably attached to the mobile device, to the attachment member attached to the launch device disposed in the horizontal position on the mobile device;
   moving the mobile device to a launch site with the assembled launch device assembled in the horizontal position on the mobile device;
   rotating the truss device at the launch site to move the attachment member and the attached assembled launch device from the horizontal position to a vertical position on the mobile device;
   detaching the truss device from the attachment member while the launch device is disposed in the vertical position on the mobile device at the launch site;
   moving the attachment member and the attached launch device, in the vertical position, from the mobile device at the launch site to a launch platform;
   detaching the attachment member from the launch device while the launch device is disposed in the vertical position on the launch platform; and
   launching the launch device from the launch platform.

2. The method of claim 1 wherein the launch device comprises at least one of a solid rocket engine, a pre-fueled launch vehicle, a missile, a rocket, an aircraft, an explosive, a payload, or a spacecraft, and the mobile device comprises a single rail-car.

3. The method of claim 1 wherein the assembling step comprises moving and attaching a plurality of stages of the launch device together horizontally using separate adjustable stage moving devices attached to the mobile device.

4. The method of claim 1 wherein the assembling step comprises:
   disposing a plurality of detached stages of the launch device horizontally on separate adjustable stage moving devices moveably attached to the truss device rotate-ably attached to the mobile device;
   moving the mobile device over a track, with the detached stages of the launch device disposed horizontally on the separate adjustable stage moving devices, to an assembly area;
   moving, at the assembly area, the separate adjustable stage moving devices relative to one another on the truss device and attaching the stages of the launch device horizontally together on the mobile device to assemble the launch device.

5. The method of claim 1 further comprising the step of moving the mobile device to a storage area with the assembled launch device assembled in the horizontal position on the mobile device.

6. The method of claim 1 wherein the rotating step comprises rotating the truss device, at the launch site, using a crane to move the attachment member and the attached assembled launch device from the horizontal position to the vertical position on the mobile device.

7. The method of claim 1 wherein the step of attaching the attachment member to the launch device comprises providing a vertical lifting apparatus comprising a closed ring at one end of the vertical lifting apparatus, articulating arm members at the other end of the vertical lifting apparatus, and a support member attached between the closed ring and the articulating arm members;
   moving the closed ring of the vertical lifting apparatus around a propulsion end of the launch device while the launch device is disposed in the horizontal position within the truss device of the mobile device;
   moving the articulating arm members of the vertical lifting apparatus, while disposed in an open position apart from one another, over another end of the launch device, and moving the articulating arm members into a closed position locked together around the another end of the launch device while the launch device is disposed in the horizontal position within the truss member of the mobile device.

8. The method of claim 1 wherein the step of moving the attachment member and the attached launch device, in the vertical position, from the mobile device at the launch site to the launch platform is done using a crane.

9. An apparatus for preparing a launch device for launch comprising:
   a mobile device for assembling a launch device in a horizontal position on the mobile device and for moving the launch device in a horizontal position to a launch site, wherein the mobile device comprises a truss device rotate-ably attached to the mobile device for moving the launch device from a horizontal position on the mobile device to a vertical position on the mobile device; and
   a lifting device, wherein the lifting device is configured to attach to both the truss device and the launch device when the launch device is disposed in the horizontal position within the truss device of the mobile device, wherein the lifting device is configured to be rotated along with the attached launch device when the truss device moves the launch device to the vertical position on the mobile device, wherein the lifting device is configured to hold the launch device in the vertical position on the mobile device when the truss device is detached from the lifting device, and wherein the lifting device is configured to be detached from the launch device when the launch device is in the vertical position to allow the launch device to be launched.

10. The apparatus of claim 9 wherein the launch device comprises at least one of a solid rocket engine, a pre-fueled launch vehicle, a missile, a rocket, an explosive, a payload, an aircraft, or a spacecraft.

11. The apparatus of claim 9 wherein a plurality of separate stage moving devices are attached to the mobile device, wherein the separate stage moving devices are moveably disposed relative to one another on the mobile device and configured to assemble separate stages of the launch device together into a horizontal position on the mobile device.

12. The apparatus of claim 11 wherein the separate stage moving devices are moveably attached within the truss device and are each configured to adjust positions and orientations of the separate stages of the launch device during horizontal assembly of the stages of the launch device within the truss device of the mobile device.

13. The apparatus of claim 9 wherein the mobile device comprises a single railcar configured to move over a rail-track.

14. The apparatus of claim 9 wherein the mobile device further comprises moveable arms connected between the mobile device and the truss device, the truss device is rotate-ably connected to a bearing of the mobile device, and the moveable arms are configured to rotate the truss-device, within the bearing, relative to the mobile device.

15. The apparatus of claim 9 wherein the lifting device comprises a first attachment member comprising a closed ring which is configured to attach to a propulsion end of the launch device, a second attachment member comprising articulating first and second arms which are configured to open and close around another end of the launch device, a support member connected between the first and second attachment members, and connection members extending between the first attachment member and the second attachment member.

16. The apparatus of claim 9 wherein the truss device further comprises a moveable hook for attaching to and detaching from the lifting device.

17. An apparatus for attaching to a launch device comprising:
    a first attachment member comprising a closed ring configured to support the propulsion end of a launch device;
    a second attachment member comprising articulating first and second arm members configured to attach and detach together around another end of the launch device to form another closed ring around the another end of the launch device;
    a support member connected between the first attachment member and the second attachment member;
    connection members extending between the first attachment member and each of the articulating first and second arms of the second attachment member; and
    a truss device configured to attach to and detach from the second attachment member, the truss device being rotate-ably attached to a mobile device and configured to raise and lower the launch device attached to the first and the second attachment members from a horizontal position on the mobile device to a vertical position on the mobile device, the truss device configured to detach from the second attachment member when the launch device is disposed in the vertical position on the mobile device.

18. The apparatus of claim 17 wherein the mobile device comprises a single railcar configured to move over a railtrack.

19. The apparatus of claim 17 wherein the truss device is rotate-ably attached to a bearing of the mobile device.

20. The apparatus of claim 17 wherein the truss device further comprises a moveable hook for attaching to and detaching from the second attachment member.

21. The apparatus of claim 17 wherein the support member comprises an elongated member.

22. The apparatus of claim 21 wherein the support member is defined by an inner shaft extending along the support member, wherein the inner shaft is configured to run electrical wiring.

23. The apparatus of claim 17 further comprising a plurality of separate stage moving devices attached to the mobile device, the separate stage moving devices configured to move relative to one another on the mobile device in order to horizontally move and assemble stages of the launch device horizontally together on the mobile device.

24. The apparatus of claim 23 wherein the separate stage moving devices are moveably attached within the truss device and are each configured to adjust positions and orientations of the separate stages of the launch device during horizontal assembly of the stages of the launch device within the truss device of the mobile device.

25. A method for attaching an apparatus to a launch device comprising:
    assembling a launch device in a horizontal position within a truss device rotate-ably attached to a mobile device;
    providing a vertical lifting apparatus comprising a closed ring at one end of the vertical lifting apparatus, articulating arm members at the other end of the vertical lifting apparatus, and a support member attached between the closed ring and the articulating arm members;
    moving the closed ring of the vertical lifting apparatus around a propulsion end of the launch device while the launch device is disposed in the horizontal position within the truss device of the mobile device;
    moving the articulating arm members of the vertical lifting apparatus, while disposed in an open position apart from one another, over another end of the launch device, and moving the articulating arm members into a closed position locked together around the another end of the launch device while the launch device is disposed in the horizontal position within the truss member of the mobile device; and
    attaching the truss device, rotate-ably attached to the mobile device, to the vertical lifting apparatus attached to the launch device which is disposed in the horizontal position within the truss device of the mobile device.

26. The method of claim 25 wherein the launch device comprises at least one of a solid rocket engine, a pre-fueled launch vehicle, a missile, a rocket, an aircraft, an explosive, a payload, or a spacecraft.

27. The method of claim 25 wherein the assembling step comprises moving and attaching a plurality of stages of the launch device together horizontally using separate adjustable stage moving devices attached to the mobile device.

28. The method of claim 25 wherein the assembling step comprises:
    disposing a plurality of detached stages of the launch device horizontally on separate adjustable stage moving devices moveably attached to the truss device rotate-ably attached to the mobile device;
    moving the mobile device over a track, with the detached stages of the launch device disposed horizontally on the separate adjustable stage moving devices, to an assembly area;
    moving, at the assembly area, the separate adjustable stage moving devices relative to one another on the truss device and attaching the stages of the launch device horizontally together on the mobile device to assemble the launch device.

29. The method of claim 25 wherein the mobile device comprises a single railcar configured to move along a railtrack.

30. The method of claim 25 further comprising the step of moving the mobile device to a storage area with the launch device assembled in the horizontal position on the mobile device.

31. The method of claim 25 wherein the attaching step comprises attaching a hook of the truss device to the vertical lifting apparatus.

32. The method of claim 25 further comprising:
    moving the mobile device to a launch site with the launch device disposed horizontally on the mobile device;
    rotating the truss device, at the launch site, to move the vertical lifting apparatus and the attached launch device from being disposed horizontally into a vertical position on the mobile device;
    detaching the truss device from the vertical lifting apparatus while the launch device is disposed in the vertical position on the mobile device at the launch site;

moving the vertical lifting apparatus and the attached launch device, while they are in the vertical position, from the mobile device at the launch site to a launch platform;

detaching the vertical lifting apparatus from the launch device while the launch device is disposed in the vertical position on the launch platform; and launching the launch device from the launch platform.

33. The method of claim 25 wherein the step of rotating the truss device at the launch site is done using a crane, and the step of moving the vertical lifting apparatus and the attached launch device is also done using the crane.

34. A method of assembling stages of a launch device comprising:

disposing a plurality of detached stages of a launch device horizontally on separate adjustable stage moving devices moveably attached to a truss device rotate-ably attached to a mobile device;

moving the mobile device over a track, with the detached stages of the launch device disposed horizontally on the separate adjustable stage moving devices attached to the truss device, to an assembly area; and moving, at the assembly area, the separate adjustable stage moving devices relative to one another on the truss device and attaching the stages of the launch device horizontally together on the truss device of the mobile device to assemble the launch device.

35. The method of claim 34 wherein the separate adjustable stage moving devices are moveably attached to and within the truss device.

36. The method of claim 35 wherein the mobile device comprises a single railcar, and the step of moving, at the assembly area, the separate adjustable stage moving devices relative to one another on the truss device comprises adjusting positions and orientations of the stage moving devices to align the stages of the launch device horizontally together on the truss device of the single railcar.

37. The method of claim 34 further comprising:

attaching, at the assembly area, an attachment member to the assembled horizontal launch device disposed on the truss device of the mobile device;

attaching, at the assembly area, the truss device to the attachment member attached to the assembled horizontal launch device disposed on the truss device of the mobile device;

moving the mobile device from the assembly area to a launch site with the assembled horizontal launch device disposed on the truss device of the mobile device; and rotating the truss device, at the launch site, using a crane to move the attachment member and the attached assembled launch device from being disposed horizontally into a vertical position on the mobile device.

38. The method of claim 37 further comprising:

detaching the truss device from the attachment member while the launch device is disposed in the vertical position on the mobile device at the launch site; and moving, using the crane, the attachment member and the attached launch device, while they are in the vertical position, from the mobile device at the launch site to a launch platform.

39. The method of claim 38 further comprising:

detaching the attachment member from the launch device while the launch device is disposed in the vertical position on the launch platform; and launching the launch device from the launch platform.

40. An apparatus for assembling stages of a launch device comprising:

a mobile device; and a plurality of separate adjustable stage moving devices attached within and to a truss device rotate-ably attached to the mobile device, wherein the separate adjustable stage moving devices are configured to adjust positions and orientations of stages of a launch device to attach the stages together in a horizontal position on the separate adjustable stage moving devices within the truss device of the mobile device.

41. The apparatus of claim 40 wherein the separate adjustable stage moving devices comprise a plurality of moveable cradles, and the mobile device comprises a single railcar configured to move over a rail-track.

42. The apparatus of claim 40 wherein each separate adjustable stage moving device is configured to move a separate one of the stages of the launch device.

43. The apparatus of claim 40 wherein each separate adjustable stage moving device is configured to move vertically, horizontally, and to tilt.

44. The apparatus of claim 40 wherein the apparatus further comprises a lifting device attached to both the launch device and the truss device.

45. The apparatus of claim 44 wherein the lifting device comprises a first attachment member comprising a closed ring attached to a propulsion end of the launch device, a second attachment member comprising articulating first and second arms attached around another end of the launch device, a support member connected between the first and second attachment members, and connection members attached between the first attachment member and the second attachment member.

46. The apparatus of claim 45 wherein the truss device is attached to the second attachment member with hooks, and wherein moveable members are attached between the mobile device and the truss device for moving the truss device from a horizontal position to a vertical position on the mobile device.

* * * * *